(12) United States Patent
Bhikhi et al.

(10) Patent No.: US 11,014,049 B2
(45) Date of Patent: May 25, 2021

(54) DESALINATION

(71) Applicant: Fujifilm Manufacturing Europe B.V., Tilburg (NL)

(72) Inventors: Vinodnarain Bhikhi, Tilburg (NL); Jacko Hessing, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 2 days.

(21) Appl. No.: 16/076,487

(22) PCT Filed: Feb. 9, 2017

(86) PCT No.: PCT/GB2017/050322
§ 371 (c)(1),
(2) Date: Aug. 8, 2018

(87) PCT Pub. No.: WO2017/137748
PCT Pub. Date: Aug. 17, 2017

(65) Prior Publication Data
US 2019/0046927 A1 Feb. 14, 2019

(30) Foreign Application Priority Data
Feb. 11, 2016 (GB) .................................. 1602484

(51) Int. Cl.
*B01D 61/50* (2006.01)
*B01D 63/08* (2006.01)
(Continued)

(52) U.S. Cl.
CPC ............. *B01D 61/50* (2013.01); *B01D 61/44* (2013.01); *B01D 63/082* (2013.01); *C02F 1/42* (2013.01);
(Continued)

(58) Field of Classification Search
CPC .... B01D 61/422; B01D 61/44; B01D 61/445; B01D 61/46; B01D 61/50; C02F 1/4693; C02F 2201/46115
See application file for complete search history.

(56) References Cited

U.S. PATENT DOCUMENTS 3,933,610 A 1/1976 Ehara et al.
7,083,730 B2 8/2006 Davis
(Continued)

FOREIGN PATENT DOCUMENTS

JP S52 124482 A 10/1977
JP S55 81783 A 6/1980
(Continued)

OTHER PUBLICATIONS

Bond, Rick et al. "Zero Liquid Discharge Desalination of Brackish Water with an Innovative Form of Electrodialysis: Electrodialysis Metathesis,", Jul. 2011, Florida Water Resources Journal, pp. 36-44.

*Primary Examiner* — Salil Jain
(74) *Attorney, Agent, or Firm* — Banner & Witcoff, Ltd.

(57) ABSTRACT

A membrane stack comprising the following components: (a) a first ion diluting compartment (D1); (b) a second ion diluting compartment (D2); (c) a first ion concentrating compartment (C1); (d) a second ion concentrating compartment (C2); and (e) a membrane wall (CEM1, mAEM, mCEM, AEM, CEM2) between each compartment and on the outside of the first and last compartment of the stack; wherein: (i) each membrane wall comprises a cation exchange membrane (CEM1, mCEM, CEM2) or an anion exchange membrane (mAEM, AEM) and the order of the cation and anion exchange membranes alternates from each wall to the next; (ii) the membrane walls (mAEM, mCEM) on each side of compartment (a) both have a higher monovalent ion selectivity than the corresponding membrane walls (AEM, CEM2) on each side of compartment (b); and
(Continued)

(iii) the stack further comprises a means for communicating fluid between compartments (a) and (b).

16 Claims, 8 Drawing Sheets

(51) Int. Cl.

| | | |
|---|---|---|
| *C02F 1/42* | (2006.01) | |
| *C02F 1/46* | (2006.01) | |
| *C02F 1/469* | (2006.01) | |
| *B01D 61/44* | (2006.01) | |
| *C02F 1/28* | (2006.01) | |
| *C02F 1/44* | (2006.01) | |
| *C02F 1/52* | (2006.01) | |
| *C02F 103/08* | (2006.01) | |
| *C02F 1/04* | (2006.01) | |

(52) U.S. Cl.
CPC .......... C02F 1/4604 (2013.01); C02F 1/4693 (2013.01); *C02F 1/04* (2013.01); *C02F 1/283* (2013.01); *C02F 1/441* (2013.01); *C02F 1/442* (2013.01); *C02F 1/444* (2013.01); *C02F 1/447* (2013.01); *C02F 1/4691* (2013.01); *C02F 2001/422* (2013.01); *C02F 2001/425* (2013.01); *C02F 2001/5218* (2013.01); *C02F 2103/08* (2013.01); *C02F 2201/004* (2013.01); *C02F 2201/007* (2013.01); *C02F 2201/4611* (2013.01); *C02F 2201/4614* (2013.01); *C02F 2201/4618* (2013.01); *C02F 2201/46115* (2013.01); *C02F 2201/46135* (2013.01); *C02F 2201/46145* (2013.01); *C02F 2301/046* (2013.01); *C02F 2301/08* (2013.01); *C02F 2303/22* (2013.01); *Y02A 20/124* (2018.01); *Y02A 20/131* (2018.01)

(56) References Cited

U.S. PATENT DOCUMENTS

| | | | |
|---|---|---|---|
| 7,459,088 B2 | 12/2008 | Davis | |
| 9,162,906 B2 | 10/2015 | Sparrow et al. | |
| 9,969,628 B2 | 5/2018 | Bhikhi et al. | |
| 2004/0055955 A1* | 3/2004 | Davis | B01D 61/44 210/652 |
| 2006/0060532 A1* | 3/2006 | Davis | B01D 61/022 210/652 |
| 2007/0284252 A1* | 12/2007 | Ganzi | B01D 61/425 204/518 |
| 2010/0116663 A1 | 5/2010 | Davis | |
| 2014/0183045 A1* | 7/2014 | Fu | B01D 61/44 204/520 |
| 2014/0227151 A1 | 8/2014 | Davis | |
| 2015/0274562 A1 | 10/2015 | Batstone et al. | |
| 2018/0036685 A1* | 2/2018 | Kunteng | B01D 61/50 |

FOREIGN PATENT DOCUMENTS

| | | |
|---|---|---|
| JP | H07 155563 A | 6/1995 |
| JP | H08 108184 A | 4/1996 |
| JP | 2007 291465 A | 11/2007 |
| JP | 2008212871 A | 9/2008 |
| WO | 2004/013048 A2 | 2/2004 |
| WO | 2006/031732 A2 | 3/2006 |
| WO | 2008153274 A1 | 12/2008 |
| WO | 2010/115287 A1 | 10/2010 |
| WO | 2014/056048 A1 | 4/2014 |
| WO | 2015/004417 A1 | 1/2015 |

\* cited by examiner

DESALINATION

RELATED APPLICATIONS

This application is a National Stage Application under 35 U.S.C. 371 of co-pending PCT application PCT/GB2017/050322 designating the United States and filed Feb. 9, 2017; which claims the benefit of GB application number 1602484.6 and filed Feb. 11, 2016 each of which are hereby incorporated by reference in their entireties.

This invention relates to membrane stacks, to electrodialysis units, to apparatus comprising at least two of the ED units and to a desalination process.

An increasing world population, decreasing water supply and droughts are leading to increased demand for fresh water. A process known as electrodialysis ("ED") has been used to convert salty water and provide potable water. This process is particularly useful in coastal areas having a plentiful supply of salty water. The first commercially available ED units were developed in the 1950's. Since then, improvements in ion exchange membranes have led to significant advances in ED.

ED units typically comprise one or more membrane stacks. Each stack comprises an anode, a cathode and a number of cell pairs through which fluids pass. A cell pair comprises an ion diluting compartment and an ion concentrating compartment. Each cell comprises a wall made from a negatively charged cation exchange membrane and a wall made from a positively charged anion exchange membrane. When a feed fluid passes through the cells and a DC voltage is applied across the electrodes, dissolved cations pass through the cation exchange membrane and towards the cathode, whereas dissolved anions pass through the anion exchange membrane and towards the anode. Typically the cathode and anode are washed with a rinse fluid during the deionisation process. In this way, the cations and anions (e.g. $Ca^{2+}$, $Na^+$, $SO_4^{2-}$ and $Cl^-$) originally present in the feed fluid permeate through the membranes walls, to leave behind a stream of desalinated water (having a lower ionic content than the original feed fluid) and streams of water containing elevated levels of ions are created. ED units are therefore useful for converting a feed fluid of sea or brackish water into potable water having a much lower content of dissolved salts. A typical ED unit is schematically illustrated in FIG. 1.

WO2015004417 ('417) addressed the technical problem of how to achieve efficient desalination in both the early and late stages of electrodialysis, when the ionic strengths of the feed fluids are very different. '417 proposed connecting two ED units (ED1 and ED2) in series, each comprising alternating pairs of cation and anion exchange membrane walls, wherein the ion exchange membranes in the first stack ED1 have a lower electrical resistance than the ion exchange membranes in the second stack ED2. The '417 process achieved both a low electrical resistance in the early phase of desalination and a low water-permeability in the later phase of desalination.

One of the problems with ED is that over time the membranes can become fouled by the build-up of scale from insoluble salts such as $CaSO_4$ and $CaCO_3$.

An improved ED process aimed at reducing the build-up of scale has been developed which is sometimes called electrodialysis metathesis or EDM for short, as is described in WO2004013048. In contrast to conventional ED units which comprise repeat units of ion diluting and ion concentrating compartments defined by 'standard' cation exchange membranes and 'standard' anion exchange membranes, the ED units used in EDM comprises a repeat unit of four compartments and four membrane walls as illustrated in FIG. 2. The ED units used in an EDM unit act like a "kidney", removing salts by "metathesizing," or "switching-partners," between the ions in order to convert low solubility salts (e.g. $CaSO_4$) into higher solubility salts (e.g. $CaCl_2$) which then do not form scale and can be easily removed from the unit like any other soluble salt. As can be seen from FIG. 2, the stacks used in EDM comprise the following components:

(a) an ion diluting compartment (D1);
(b) a compartment for the supply of NaCl solution;
(c) a first ion concentrating compartment (C1);
(d) a second ion concentrating compartment (C2); and
(e) a membrane wall between each compartment (AEM, CEM and mAEM) and on the outside of the first and last compartment of the stack (mCEM1 and mCEM2);

wherein:
(i) each membrane wall comprises a cation exchange membrane or an anion exchange membrane and the order of cation and anion exchange membranes alternates from each wall to the next;
(ii) the membrane walls on each side of the ion diluting compartment (a) both comprise a 'standard' membrane which does not discriminate between higher- and monovalent anions/cations.

Thus currently available ED units used in EDM, as illustrated in FIG. 2, differ from the conventional ED units illustrated in FIG. 1 in that ED units used in EDM comprise four different solution compartments and a single unit or a repeating unit of four membrane walls (two membranes being 'standard' (i.e. permeable to both mono- and higher-valent ions) and two being monovalent ion-selective). In contrast, the conventional ED units illustrated in FIG. 1 comprise a repeat unit of only two solution compartments and two membrane walls (both being 'standard' membranes permeable to both mono- and higher-valent ions). In the currently available ED units used in EDM the four solution compartments and four membrane walls may be repeated as indicated in FIG. 2.

A problem with the known ED units used in EDM illustrated in FIG. 2 is that it is difficult to produce potable water from sea water with a high yield due to the large differences in concentration between the ion diluting and ion concentrating compartments. This leads to high water loss due to osmotic transport of water molecules through the membrane walls from the ion diluting compartment to the ion concentrating compartments. A further disadvantage of the known EDM units illustrated in FIG. 2 is the requirement for the supply of a sodium chloride solution (in the right hand-most compartment) which leads to higher costs, not only related to the materials required (i.e. the sodium chloride) but also to extra energy due to the transport of the sodium and chloride ions through the membrane walls. The requirement for a compartment dedicated to a supply of NaCl solution also reduces the desalination capacity of the EDM unit. It is an object of the present invention to reduce the problems present in the currently available EDM units illustrated in FIG. 2 and to provide more cost effective and efficient desalination.

According to a first aspect of the present invention there is provided a membrane stack comprising the following compartments:

(a) a first ion diluting compartment;
(b) a second ion diluting compartment;
(c) a first ion concentrating compartment;
(d) a second ion concentrating compartment; and (e) a membrane wall between each compartment and on the outside of the first and last compartment of the stack;
wherein:
(i) each membrane wall comprises a cation exchange membrane or an anion exchange membrane and the order of the cation and anion exchange membranes alternates from each wall to the next;
(ii) the membrane walls on each side of compartment (a) both have a higher monovalent ion selectivity than the corresponding membrane walls on each side of compartment (b); and
(iii) the stack further comprises a means for communicating fluid between compartments (a) and (b).

In this specification the EDM units of the present invention, which are a type of ED unit, are often referred to simply as ED units. Thus in relation to the present invention the terms "EDM" and "ED" are largely interchangeable.

Also in this specification, for brevity reasons cation exchange membrane walls having a high selectivity for monovalent cations compared to higher-valent cations (e.g. the cation exchange membrane wall on one side of compartment (a)) are often referred to as mCEM, whereas membrane walls having low selectivity for monovalent cations compared to higher-valent cations are simply referred to as 'standard cation exchange membrane walls' or CEM. Analogously, anion exchange membrane walls having a high selectivity for monovalent anions compared to higher-valent anions (e.g. the anion exchange membrane wall on one side of compartment (a)) are often referred to as mAEM, whereas membrane walls having low selectivity for monovalent anions compared to higher-valent anions are simply referred to as 'standard anion exchange membrane walls' or AEM.

The stack of the invention is suitable for desalination of seawater, brackish water and brine and the production of desalinated water in high yield. The desalinated water may be used for any purpose, including as potable water, for irrigation or discharged to surface water. Optionally further water treatment processes (e.g. one or more of reverse osmosis (RO), electrodeionization (EDI), capacitive deionization (CDI), membrane distillation (MD), nanofiltration (NF), ultrafiltration (UF), ion exchange (IE) and treatment with active carbon) may be combined with the use of the stacks, ED units and process of the present invention. The stack of the present invention may be used to produce two highly concentrated salt streams without problems related to scaling. If desired both concentrated streams may be further treated to produce valuable salts such as sodium chloride, magnesium hydroxide, magnesium carbonate and calcium sulfate in high purity.

BRIEF DESCRIPTION OF THE DRAWINGS

In FIG. 1 depicting a conventional ED unit, the feed fluid enters ion diluting compartment (D1), whereupon anions pass through the anion exchange membrane (AEM1) and into a first ion concentrating compartment (C1) and cations pass through the cation exchange membrane (CEM2) and into a second ion concentrating compartment (C2). The anode (+) provides the attractive force which pulls the anions through the AEM and the cathode (−) provides the attractive force which pulls the cations through the CEM. The principle repeating unit of [AEM—ion diluting compartment—CEM—ion concentrating compartment] is also shown in FIG. 1.

Figure 1:
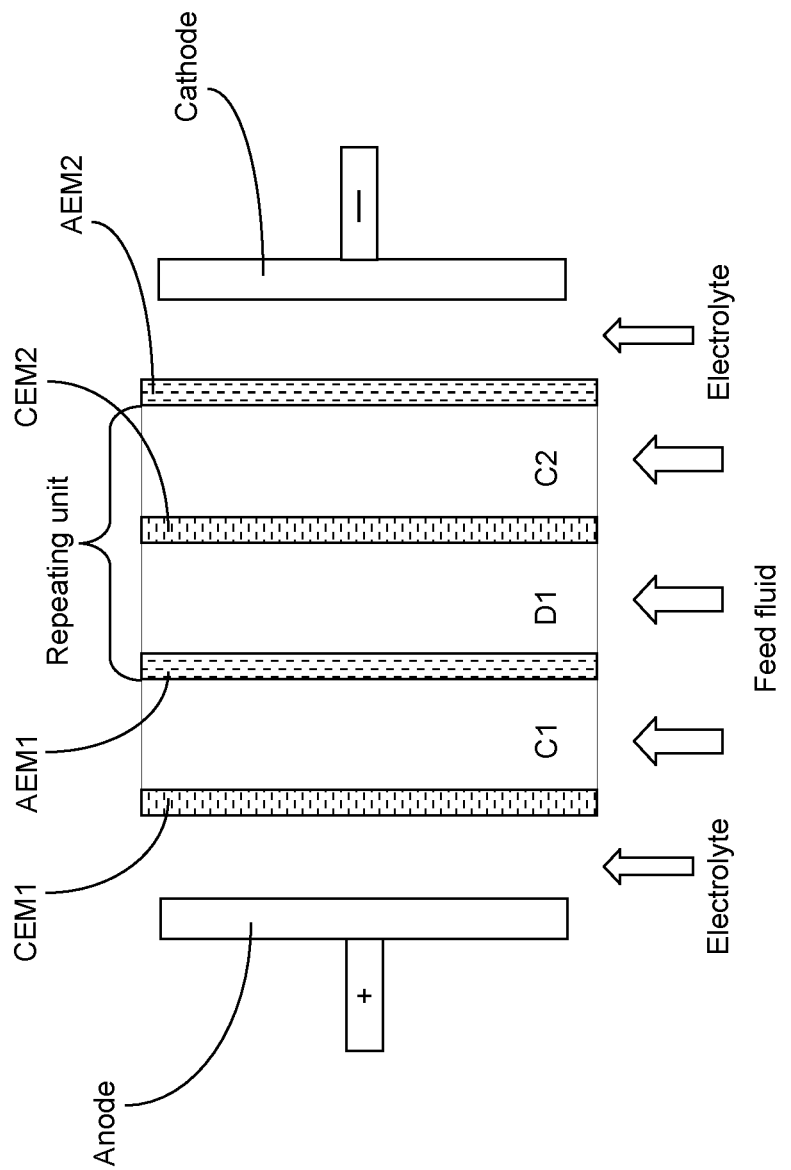
FIG. 1 schematically depicts a conventional ED unit.
Figure 2:
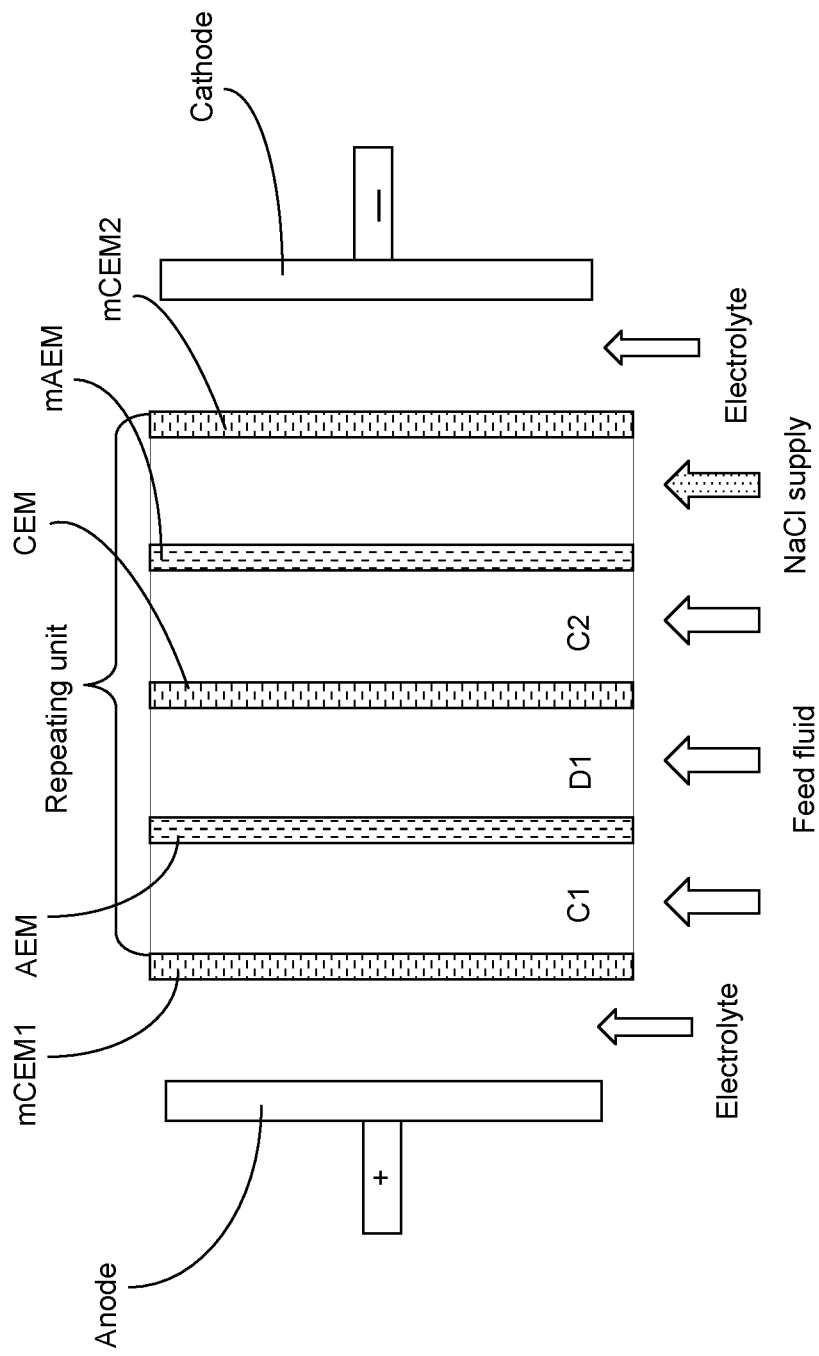
FIG. 2 schematically depicts a conventional EDM unit (i.e. an ED unit used for EDM).

The repeating unit of currently available EDM units shown in FIG. 2 comprises four compartments, i.e. only one ion diluting compartment (D1), two ion concentrating compartments (C1 and C2) and one compartment for the supply of NaCl solution. Again the anode (+) provides the attractive force which pulls the anions through the AEMs and the cathode (−) provides the attractive force which pulls the cations through the CEMs. The membrane walls mAEM, mCEM1 and mCEM2 have a higher selectivity for monovalent ions than the membrane walls AEM and CEM. For example, mAEM is a monovalent selective anion exchange membrane wall, mCEM1 and mCEM2 are monovalent selective cation exchange membrane walls, AEM is a membrane wall through which both monovalent and polyvalent anions may pass and CEM is a membrane wall through which both monovalent and polyvalent cations may pass.

Figure 3:
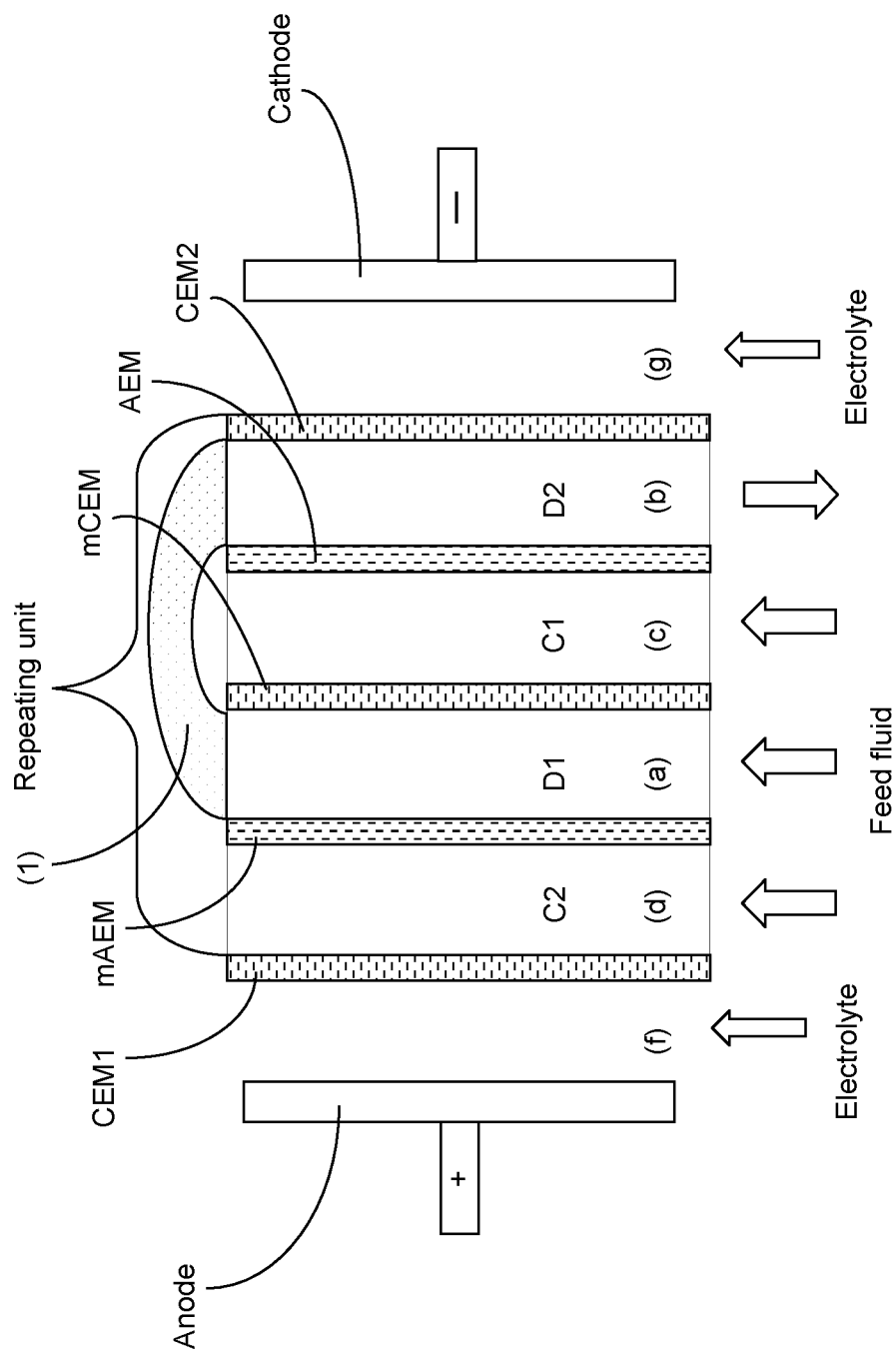
FIG. 3 schematically depicts the EDM unit according to the present invention which is suitable for use in EDM.

The ED/EDM unit of the present invention is illustrated in FIG. 3. This unit comprises a first ion diluting compartment (a); a second ion diluting compartment (b); a first ion concentrating compartment (c); and a second ion concentrating compartment (d). Each membrane wall (CEM1, mAEM, mCEM, AEM and CEM2) comprises a cation exchange membrane or an anion exchange membrane and the order of cation and anion exchange membrane walls alternates from each wall to the next. The membrane walls (mAEM and mCEM) on each side of the first ion diluting compartment (a) both have a higher monovalent ion selectivity than the corresponding membrane walls (AEM and CEM) on each side of the second ion diluting compartment (b). Furthermore, the stack comprises a pipe (1) or similar means for communicating fluid between compartments (a) and (b). The means for communicating fluid between compartments (a) and (b) preferably provides a pathway for a fluid stream to flow from compartment (a) to compartment (b) and/or from compartment (b) to compartment (a). This pathway may be, for example, a direct connection between compartments (a) and (b) of a stack (i.e. the same stack) or between compartments (a) and (b) of two different stacks. Thus the means for communicating fluid may alternatively be referred to as a means for providing fluid connectivity. The labels D1, D2, C1 and C2 are included in FIG. 3 as reminder of which are ion concentrating compartments and which are ion diluting compartments.

Thus the membrane walls on each side of the first ion diluting compartment (a) have a higher monovalent ion selectivity (e.g. both are monovalent selective) than the membrane walls on each side of the second ion diluting compartment (b) (e.g. both comprise 'standard' membranes which allow both monovalent and higher-valent ions to pass through). Again the anode (+) provides the attractive force which pulls the anions towards the anode and into the concentrate streams and the cathode (−) provides the attractive force which pulls cations towards the cathode and into the concentrate streams. In contrast to the known EDM unit shown in FIG. 2, the unit of FIG. 3 comprises two (instead of one) ion diluting compartments (a) and (b). Furthermore, the two ion diluting compartments (a) and (b) are in fluid communication with each other, e.g. by means of a connecting pipe or hose (1). Also the flow direction of fluid through ion diluting compartment (b) may be different from that of (a), e.g. opposite that of (a). Still further, the unit of the invention comprises an ion diluting compartment having a wall on each side comprising membranes which have a higher selectivity for monovalent ions than higher-valent ions (mAEM and mCEM) whereas the ion diluting compartment shown in FIG. 2 has a wall on each side comprising a 'standard' cation or anion exchange membrane.

Figure 4:
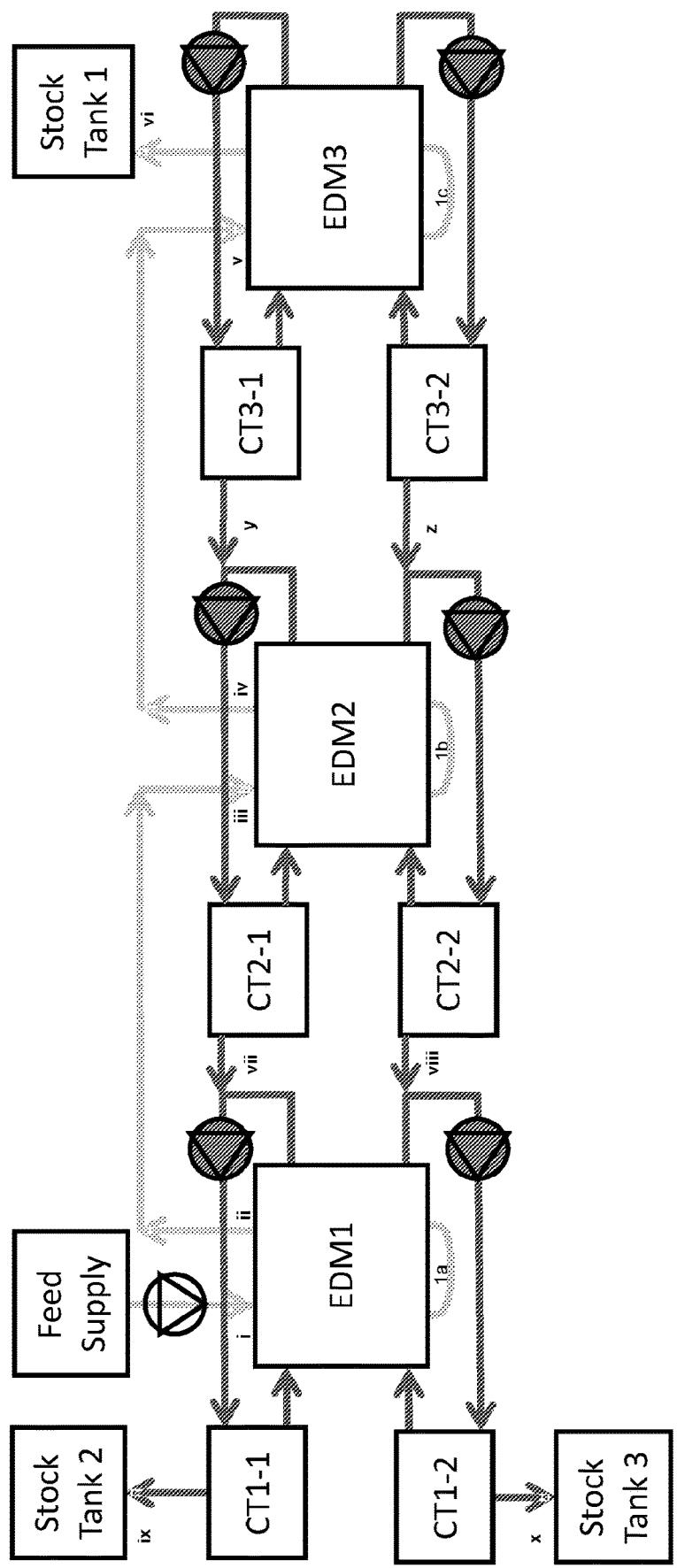
FIG. 4 is a flow chart depicting an apparatus according to the present invention comprising three EDM units.

FIG. 4 is a flow chart showing an apparatus according to the present invention comprising three ED units (EDM1, EDM2 and EDM3 in that order) fluidly connected in series. Feed fluid, being the fluid requiring desalination, is fed from a feed tank (Feed Supply) into a first ion diluting compartment of the first ED unit (EDM1) at point (i) whereafter it passes through the pipe (1a) and into the second ion diluting compartment. Simultaneously concentrate solutions are circulated through circulation tanks CT1-1 and CT1-2 and through the first and second ion concentrating compartments of the first ED unit (EDM1) respectively, in a feed and bleed mode of operation. In this mode of operation concentrate solutions are fed from the outlets of the ion concentrating compartments of the second ED unit (EDM2) into the respective ion concentrating compartments of EDM1 at points (vii) and (viii), circulate through those ion concentrating compartments of EDM1 and through circulation tanks CT1-1 and CT1-2 and bled to product stock tanks Stock Tank 2 and Stock Tank 3 at points (ix) and (x) respectively. Partially desalinated fluid exits the second ion diluting compartment of the first ED unit (EDM1) at point (ii).

The partially desalinated fluid is fed into the first ion diluting compartment of the second ED unit (EDM2) at point (iii), passes through the first ion diluting compartment and then enters the second ion diluting compartment via the pipe (1b). Simultaneously concentrate solutions are circulated through circulation stock tanks CT2-1 and CT2-2 and the first and second ion concentrating compartments of the second ED unit (EDM2) respectively, also in a feed and bleed mode of operation. In this mode of operation concentrate solutions are fed from the circulation stock tanks CT3-1 and CT3-2 of the third ED unit (EDM3) into the respective ion concentrating compartments of EDM2 at points (y) and (z), circulate through those ion concentrating compartments of EDM2 and through circulation tanks CT2-1 and CT2-2 and bled to the respective ion concentrating compartments of EDM1 at points (vii) and (viii). Desalinated fluid exits the second ion diluting compartment of the second ED unit (EDM2) at point (iv).

The largely desalinated fluid is then fed into the first ion diluting compartment of the third ED unit (EDM3) at point (v), passes through the first ion diluting compartment and then enters the second ion diluting compartment of the third ED unit (EDM3) via pipe (1c). Simultaneously concentrate solutions are circulated through circulation stock tanks CT3-1 and CT3-2 and through the first and second ion concentrating compartments of the third ED unit (EDM3) respectively, also in a feed and bleed mode of operation. In this mode of operation the ion concentrating compartments of the third ED unit (EDM3) are fed from circulation tanks CT3-1 and CT3-2 and also obtain some ions and water from the ion diluting compartments of the third ED unit (EDM3) by osmosis and electro-osmosis through the walls on each side of those ion diluting compartments. The circulation tanks CT3-1 and CT3-2 are bled to the respective ion concentrating compartments of EDM2 at points (y) and (z). Desalinated fluid exits the second ion diluting compartment of the third ED unit (EDM3) and is fed into a product stock tank Stock Tank 1 at point (vi).

Figure 5:
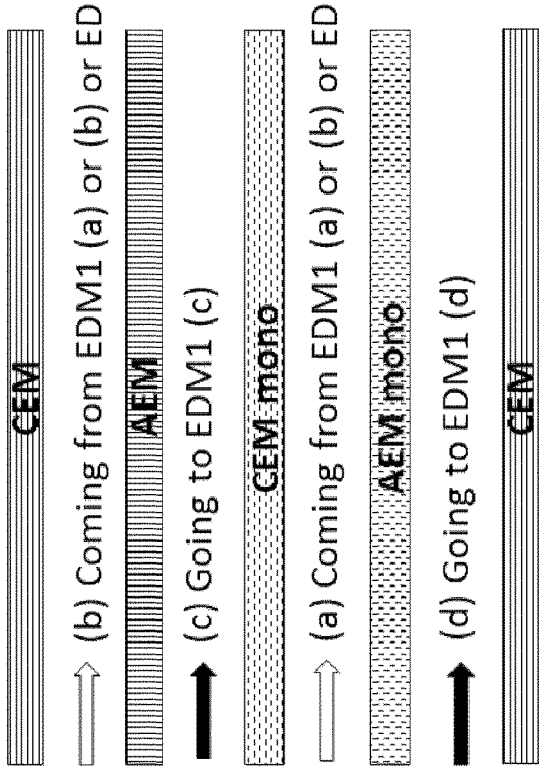
FIG. 5 illustrates a preferred fluid flow arrangement in an apparatus according to the invention comprising two EDM units.
Figure 5:
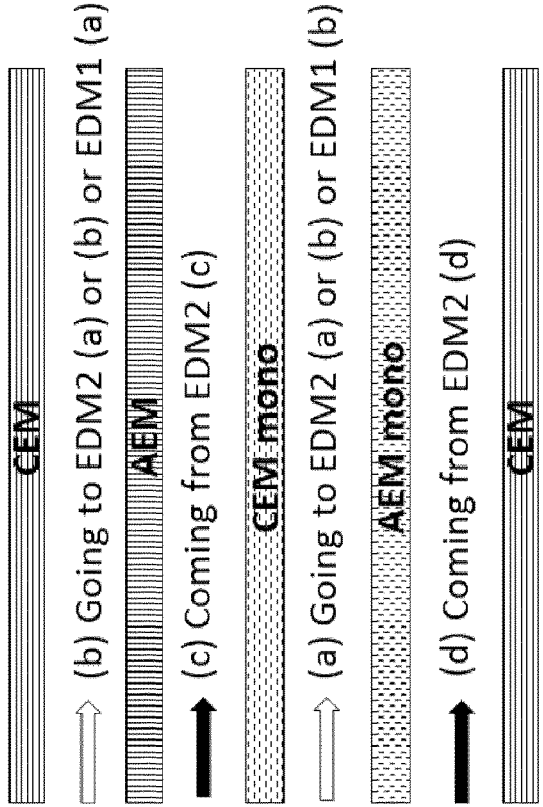

FIG. 5 illustrates a preferred fluid flow arrangement in an apparatus according to the invention comprising two stacks, EDM stack 1 (EDM1) and EDM stack 2 (EDM2). In each stack, (a), (b), (c) and (d) refer to the compartments (a), (b), (c) and (d) respectively. In EDM stack 1, fluid to be desalinated flows through ion diluting compartment (a) or (b) and is then fed into the other ion diluting compartment (b) or (a) of that stack, after which it exits EDM stack 1 and enters either ion diluting compartment (a) or (b) of EDM stack 2. The fluid passing through EDM stack 1, compartment (c), is obtained from the outlet of EDM stack 2, compartment (c). The fluid passing through EDM stack 1, compartment (d), is obtained from the outlet of EDM stack 2, compartment (d). Referring to EDM stack 2, the fluid to be desalinated is obtained from EDM stack 1 and flows through ion diluting compartment (a) or (b) of EDM stack 2 and is then fed into the other ion diluting compartment (b) or (a) of that stack. The fluid exiting EDM stack 2, compartments (c) and (d) are fed into EDM stack 1, compartments (c) and (d) respectively. Desalinated fluid exiting EDM stack 2 may be collected or further treated, e.g. by passing through one or more further EDM stacks.

Figure 6A:
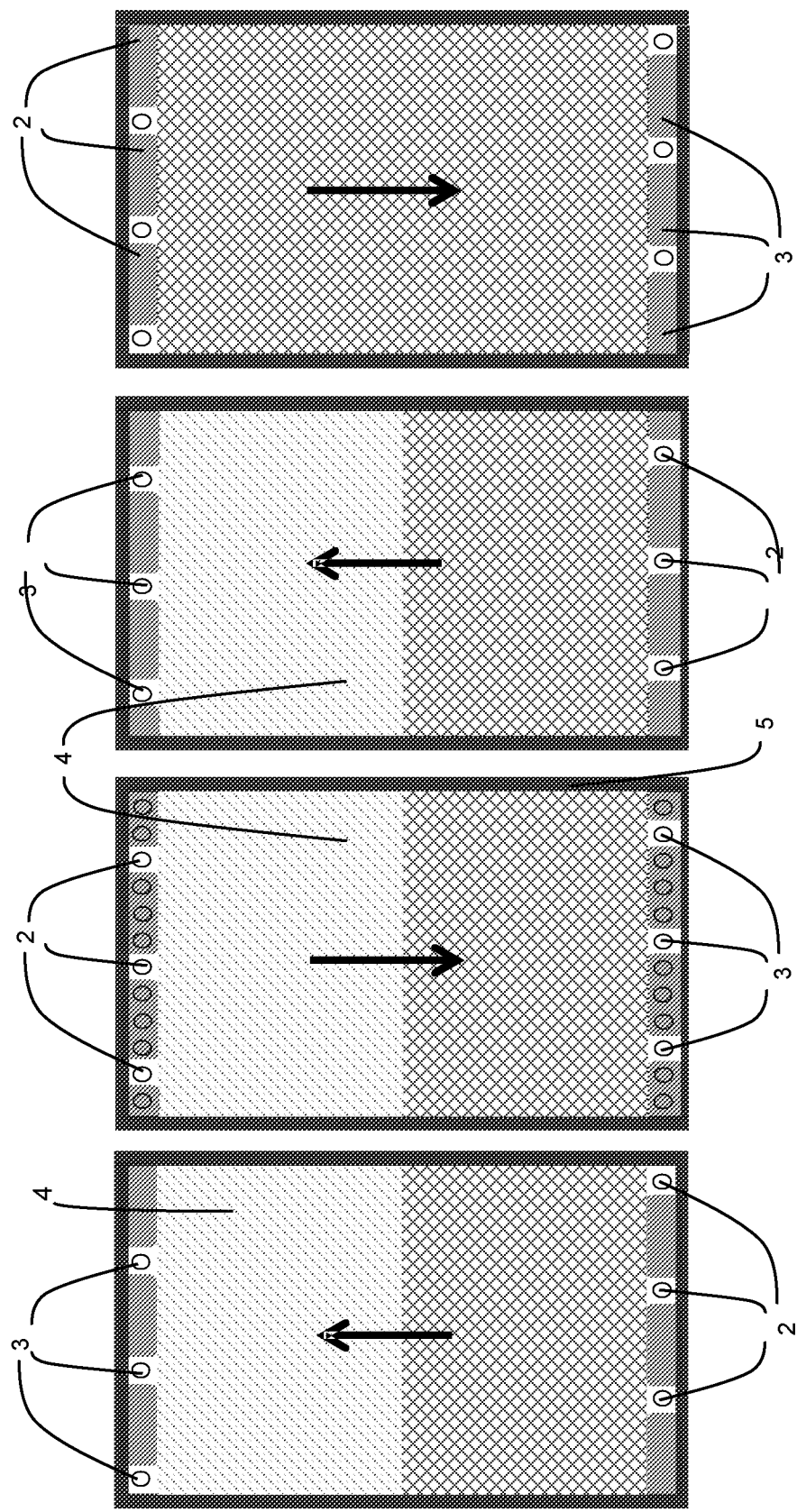
FIGS. 6a to 6c illustrates several compartment inlet and outlet designs wherein the flow direction in adjacent compartments is indicated by an arrow.
Figure 6B:
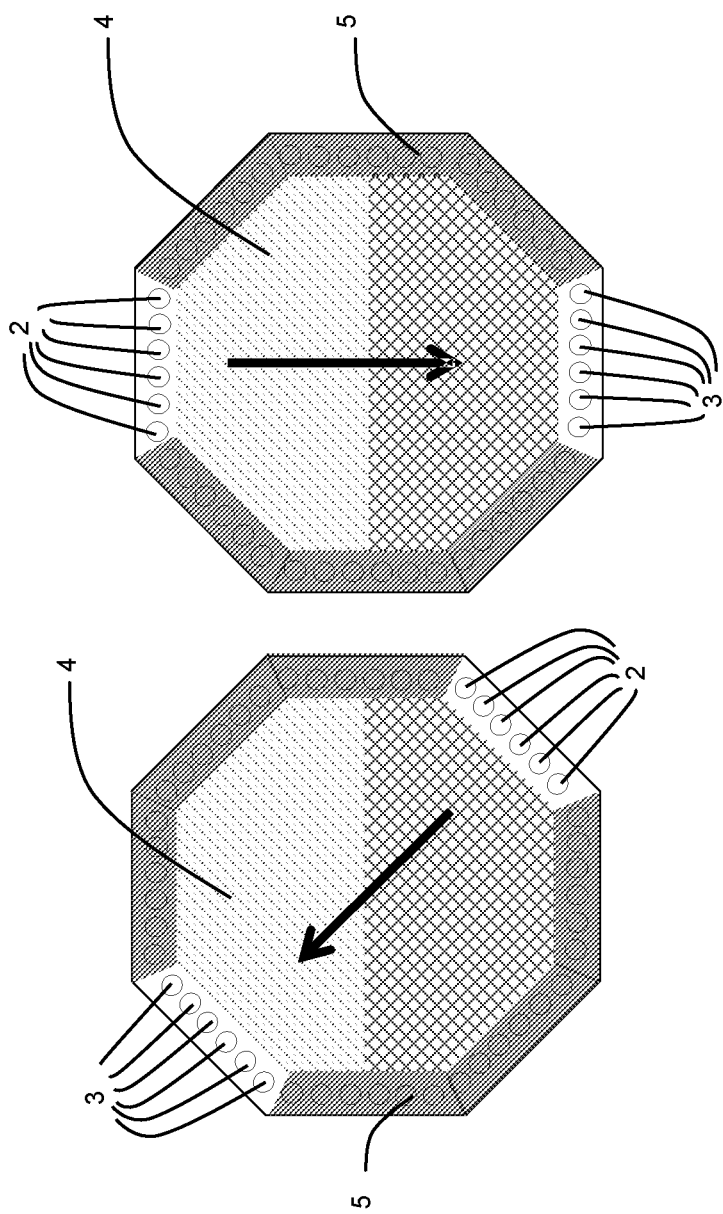
Figure 6C:
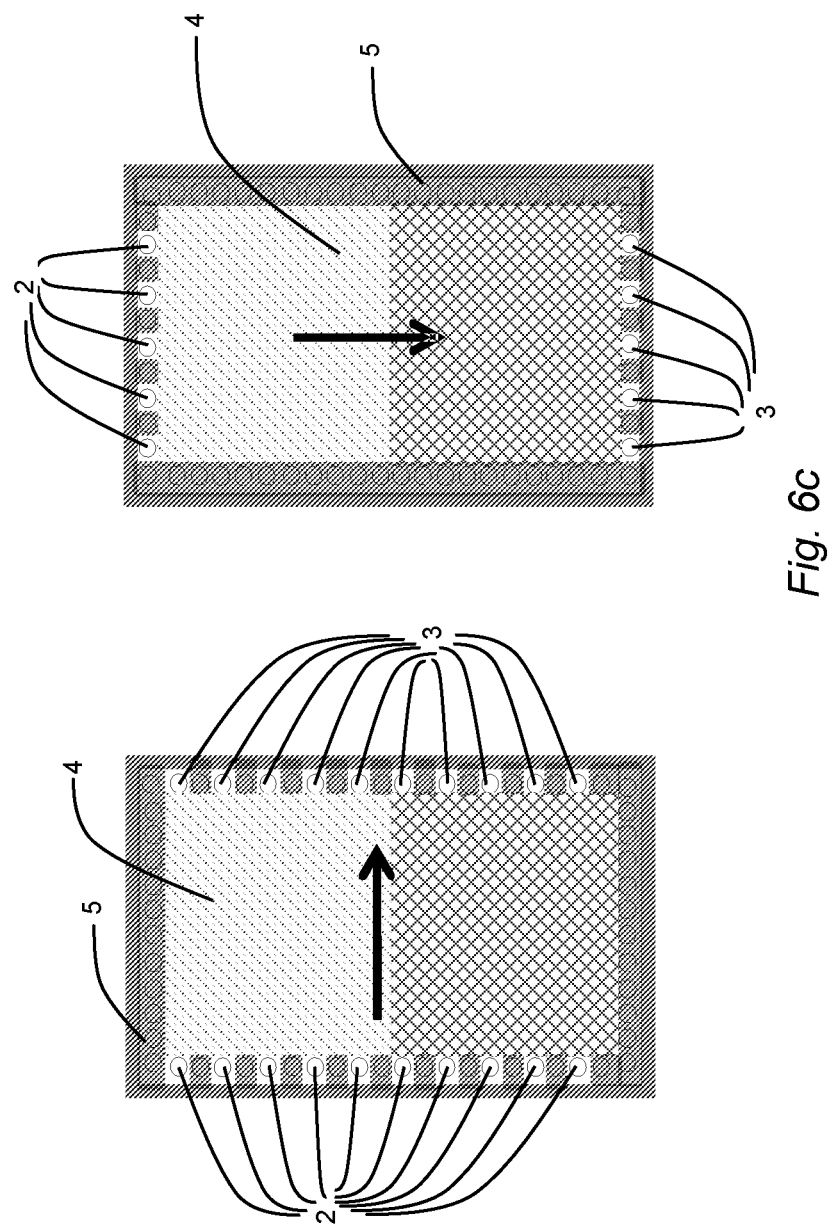

FIGS. 6a to 6c schematically illustrate a horizontal, sectional view through adjacent compartments in a plane parallel to the membranes which form top and bottom walls on each side of the compartment (membrane walls not shown). The compartments have respectively a rectangular (FIG. 6a), octagonal (FIG. 6b) and rectangular shape (FIG. 6c). Each compartment comprises inlet openings (2), outlet openings (3), a spacer netting (4) and a peripheral sealing gasket (5) providing fluid-tight side walls for each compartment. The arrows indicate the main flow direction of fluid through each compartment from the inlet openings (2) to the outlet openings (3). Ion exchange membranes (not shown) form the wall between each compartment and the next and the spacer netting (4) keeps the membrane walls of each compartment apart and the path for fluid through the compartment open. In FIG. 6a the inlet and outlet designs of four adjacent compartments are shown e.g. for the compartments (c), (b), (d) and (a) respectively. In FIGS. 6b and 6c the designs of two representative compartments are shown, but also in the case of FIGS. 6b and 6c each repeating unit of the membrane stack comprises four different compartments.

The units, apparatus and process of the invention are suitable for desalination of ionic solutions, e.g. seawater, brackish water and brine and may produce desalinated water in high yield without problems related to scaling. Furthermore, the streams having high ionic concentration which are a byproduct of the process may be used to produce valuable salts in high purity, e.g. sodium chloride, magnesium hydroxide, magnesium carbonate and calcium sulfate. Thus the units, apparatus and process of the invention are suitable for any application where electrodialysis is required and have the advantage of avoiding or reducing problems related to scaling. Furthermore, the units, apparatus and process of the invention can be used to provide water having a particularly low concentration of dissolved ions in high yield and also provides highly concentrated product streams.

Without departing from the teachings of the present invention, in the above paragraph the terms "first" and "second" may be interchanged and do not specify a particular order except where this is explicitly specified.

The membrane walls on each side of each compartment typically form a fluid tight seal (except for the water permeated through the membranes as a result of osmotic or electro-osmotic transport and except for fluid inlets and outlets intended to allow fluid to pass through the compartment in a controlled manner) with a membrane on the other side of that compartment, optionally via a gasket as discussed herein. The membrane walls on each side of a compartment may be secured to the compartment (i.e. the spacer or gasket) by clamping or to each other e.g. by welding, curing or an adhesive.

Preferably the mAEM and mCEM each independently has a higher selectivity for monovalent ions than for higher-valent ions. Thus preferably the selectivity of the mAEM for chloride ions compared to sulfate ions is more than 1.1, more preferably more than 1.5 and especially more than 2. Preferably the selectivity of the mCEM for sodium ions compared to calcium ions is more than 1.1, more preferably more than 1.5 and especially more than 2. Selectivity may be regarded as the relative transport rate through the membrane. Thus it is preferred that monovalent cations (e.g. $Na^+$) pass through the mCEM more quickly than higher-valent cations (e.g. $Ca^{2+}$), e.g. more than 1.1 times as quickly, more preferably more than 1.5 times as quickly and especially more than twice as quickly. Also it is preferred that monovalent cations (e.g. $Cl^-$) pass through the mAEM more quickly than higher-valent cations (e.g. $SO_4^{2-}$), e.g. more than 1.1 times as quickly, more preferably more than 1.5 times as quickly and especially more than twice as quickly. Preferably the 'standard' AEM and the 'standard' CEM each independently has a lower selectivity for monovalent ions compared to higher-valent ions than the mAEM and mCEM respectively. Preferably the 'standard' AEM has a selectivity for monovalent cations (e.g. $Cl^-$) compared to higher-valent cations (e.g. $SO_4^{2-}$) of less than 1.1, more preferably less than 1. The 'standard' CEM preferably has a selectivity for monovalent cations (e.g. $Na^+$) compared to higher-valent cations (e.g. $Ca^{2+}$) of less than 1.1, more preferably less than 1.

Preferably selectivity of the mCEM for monovalent cations compared to higher-valent cations is at least 30% (i.e. 1.3 times) higher, more preferably at least 50% (i.e. 1.5 times) higher and especially at least 100% (i.e. 2 times) higher than the selectivity of the CEM for monovalent cations compared to higher-valent cations.

Preferably selectivity of the mAEM for monovalent anions compared to higher-valent anions is at least 30% (i.e. 1.3 times) higher, more preferably at least 50% (i.e. 1.5 times) higher and especially at least 100% (i.e. 2 times) higher than the selectivity of the AEM for monovalent anions compared to higher-valent anions.

In use the selectivity of the membrane walls depends to some extent on various aspects such as feed composition, flow rate, current density and spacer properties. Selectivity may be determined by measuring the electrical resistance (ER) of a 0.05N solution of single salts at a temperature of 25° C., e.g. the ER of 0.05N solutions of sodium sulfate and sodium chloride respectively are measured and the ratio of the ER values (ER sodium sulfate/ER sodium chloride) is an indication for the monovalent selectivity of the anion exchange membrane. Analogously the ratio of the ER of 0.05N solutions of calcium chloride and sodium chloride (ER calcium chloride/ER sodium chloride) provides a measure of the monovalent selectivity of the cation exchange membrane.

The monovalent ion selectivity of the membranes may be determined by recirculating a feed fluid through an ED Test unit for 200 minutes, measuring the concentration of monovalent ions and higher-valent ions in the concentrate and diluate, and then performing the calculation of Formula (1) below:

$$\text{Monovalent Ion Selectivity} = (mc/md)/(hc/hd) \quad \text{Formula (1)}$$

wherein:

mc is the concentration of monovalent ions in the concentrate;

md is the concentration of monovalent ions in the diluate;

hc is the concentration of higher-valent ions in the concentrate; and hd is the concentration of higher-valent ions in the diluate.

In the above calculations, the monovalent anion is preferably $Cl^-$, the higher-valent anion is preferably $SO_4^{2-}$, the monovalent cation is preferably $Na^+$ and the higher-valent anion is preferably $Ca^{2+}$. For convenience concentrations are typically expressed as mg of ion per litre of diluate or concentrate as the case may be.

Suitable methods for measuring the concentration of ions in the concentrate and diluate include ion chromatography for anions and inductively coupled plasma optical emission spectrometry (ICP-OES) for cations. The method for determining selectivity is described in more detail in the Examples below.

As examples of mAEMs there may be mentioned Neosepta ACS from Tokuyama, Selemion ASV from Asahi Glass, PC MVA from PCA GmbH, Aciplex A-192 from Asahi Chemical Industry.

As examples of mCEMs there may be mentioned Neosepta CIMS from Tokuyama, Selemion CSO from Asahi Glass, PC MVK from PCA GmbH, PC VK from PCA GmbH, Aciplex K-192 from Asahi Chemical Industry.

As examples of 'standard' AEMs there may be mentioned Neosepta AMX from Tokuyama, Selemion AMV from Asahi Glass, PC SA from PCA GmbH.

As examples of standard CEMs there may be mentioned Neosepta CMX from Tokuyama, Selemion CMV from Asahi Glass, PC SK from PCA GmbH.

Preferably the membranes have a low water permeability, e.g. a water permeability less than 25 $m^3/m^2 \cdot s \cdot kPa$, especially less than 15 $m^3/m^2 \cdot s \cdot kPa$.

Preferably the membranes have a low electrical resistance, e.g. an electrical resistance of less than 6 $ohm \cdot cm^2$, especially less than 3 $ohm \cdot cm^2$.

Electrical resistance and water permeability may be measured as described in WO2015004417, page 10, line 22 to page 13, line 17.

In one embodiment all of the compartments are free from liquid. In another embodiment all of the compartments comprise a liquid.

The membranes may have any surface profile, for example they may have a smooth surface on both sides, a smooth surface on one side and a textured surface on the other side or they may have a textured surface on both sides.

The textured surface(s), when present, optionally comprise ribs and/or protrusions, e.g. having a height between 5 and 800 μm, as desired. Protrusions having a height near the lower end of the aforementioned range may be used to enhance the turbulence of fluid flowing through the compartment comprising that surface. Higher protrusions may contribute to keeping the membrane apart from an adjacent membrane, thereby avoiding the need for a fluid-permeable spacer.

Examples of suitable protrusions include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more of the foregoing. Preferred are protrusions which have an average length (L) to average width (W) ratio of 10:1 to 1:10, more preferably 7:1 to 1:7, especially 5:1 to 1:5, more especially 2.5:1 to 1:2.5, when measured at the base of the protrusion. These preferences arise because better convection and lower blockage problems can often be obtained with the aforementioned L to W ratios than when continuous ribs are used where a particle may completely block the passage of fluid between two ribs. Preferably the texture comprises protrusions at least 80% (preferably 100%) of which have a maximum dimension in all directions (length, width and height) of less than 20 mm. Preferably the texture comprises protrusions which have a maximum dimension in all directions (length, width and height) of 0.04 to 10 mm, more preferably 0.05 to 6 mm. Preferably the texture comprises protrusions which are separated from each other by an average of at least 0.1 mm, more preferably at least 0.5 mm, e.g. by 1, 2, 4, 8 or 12 mm.

Optionally the compartments comprise fluid-permeable spacers, especially when the membrane walls on one or each side of a compartment is not textured. Such spacers help to keep the membranes present in the side walls apart and keep the compartment open so that fluid may flow freely therethrough.

Preferred fluid-permeable spacers are made from an inert, electrically insulating material, e.g. polyethylene, polypropylene, polyamide, polyethylene terephthalate, polyimide, polytetrafluorethylene, polyvinylidene fluoride, fiberglass or polyvinylchloride. Optionally the fluid-permeable spacer is coated with an ion-conducting layer to enhance ion transport and to reduce spacer shadow effects.

Examples of commercially available materials which may be used as the fluid-permeable spacer include extruded netting from Delstar (e.g. N01014-60PP-NAT, N1014-90PP-NAT and N01017-90PP-NAT), from Industrial Netting (e.g. XN-4820), and woven material from Sefar (e.g. NITEX 06-475/56, NITEX 03-300/51, NITEX 06390/47, NITEX 07-240/59 and NYTAL PA 06-212).

The preferred fluid-permeable spacers comprise a woven and/or non-woven netting or mesh, preferably having a thickness of 50 to 1000 µm, more preferably 100 to 1000 µm, especially 150 to 800 µm. The orientation of the strands of the netting is preferably about 45° with respect to the main flow direction of fluid through the compartment comprising the spacer. The size of the openings in the fluid-permeable spacers is preferably between 70 and 500 µm in diameter, more preferably between 100 and 400 µm in diameter.

Preferably the stacks further comprise one or more gaskets between each membrane. The function of the gaskets is to keep the edges of the membrane walls a desired distance apart and to provide a fluid-tight seal at the edges of the membrane walls. Thus gaskets can be used to define an edge wall of the compartments.

The gaskets may be continuous or interrupted by one or more openings, e.g. to allow fluid to enter and exit the compartment in a controlled manner.

Preferred gaskets have a Shore A hardness of between 10 and 80. Preferably the gasket is made from a silicone, polyurethane, a rubber (e.g. ethylene propylene diene monomer (EPDM)), polyethersulfone (PES) or ethylenevinyl acetate.

Alternatively the membrane walls may be secured together towards their edges using an adhesive instead of or in addition to using a gasket.

The stacks further comprise fluid inlets and fluid outlets. Depending on the desired configuration, all fluid inlets may be on the same side of the stack as each other and this enables cocurrent flow. In another embodiment, the fluid inlets alternate from one side to the opposite side from each compartment to the next (adjacent) compartment. In this way, a countercurrent flow can be achieved, i.e. the direction of fluid flow in a compartment is at an angle of 180° with respect to the direction of fluid flow in an adjacent compartment. Alternatively, the inlets alternate from one side to the next with each compartment so that a crossflow arrangement can be achieved, e.g. the direction of fluid flow in a compartment is at an angle of 90° with respect to the direction of fluid flow in an adjacent compartment.

By choosing stacks of different shapes (e.g. square, rectangular, octagonal etc.) one may position inlets for each compartment different from the next compartment and thereby choose different flow directions for fluid passing through adjacent compartments. Thus one may configure the inlets such that the direction of fluid flow through one or more compartment is not the same as the direction of fluid flow through the next (adjacent) compartment(s) as described in more detail above. For example one may ensure that the relative direction of fluid flow through two adjacent compartments is crossflow (e.g. at a relative angle of between 40 and 140 degrees). Preferably the flow of fluid through adjacent compartments is perpendicular, but also any angle (e.g. 45° or 135°) may be used simply by orientating the inlets and outlets for two adjacent compartments at an appropriate angle relative to each other and angles of 90° or higher are preferred.

For example the stack may be configured such that fluid flowing through compartment (a) or (b) runs at an angle of 0 to 180 degrees, preferably 40 to 140 degrees, relative to fluid flowing through compartments (c) or (d). In a preferred embodiment the stacks and ED units of the present invention are configured such that fluids flowing through the ion concentrating compartment(s) flow in an opposite direction (i.e. 180°) to fluid flowing through the second ion diluting compartment (b). In another preferred embodiment, especially for square and rectangular-shaped stacks, the stacks and ED units of the present invention are configured such that fluid flowing through ion diluting compartment (a) and/or (b) flows in an opposite direction (180°) to fluid flowing through one of the adjacent ion concentrating compartments and in a perpendicular direction (90°) to fluid flowing through the other of the adjacent ion concentrating compartments. This configuration reduces undesirable osmotic water transport between the compartments.

Thus the following relative configurations are preferred for the inlets of adjacent compartments, whereby an angle of 0° is regarded as cocurrent, an angle of 45°, 90° and 135° as crossflow and an angle of 180° as countercurrent:

inlets which provide alternatingly counter current flow and crossflow;
inlets which provide alternatingly cocurrent flow and crossflow;
inlets which provide alternatingly counter current flow, crossflow, cocurrent flow and crossflow;
inlets which provide either counter current flow, cocurrent flow or a combination thereof;
inlets which provide only crossflow.

A crossflow configuration is preferred because this configuration is particularly straightforward to implement for a rectangular stack having four sides. If desired crossflow configuration for some adjacent compartments may be combined with a counter current flow direction for other adjacent compartments in order to optimise desalination efficiency. Also for octagonal shaped stacks crossflow (i.e. an angle of 45°, 90° or 135°) can be realized additional to cocurrent (0°) and countercurrent (180°).

Generally, for adjacent compartments crossflow and counter flow are preferred, i.e. the direction of fluid flow through adjacent compartments is preferably at an angle of 90°, 135° or 180° relative to the direction of flow through the next (adjacent) compartment.

The means for communicating fluid between compartments (a) and (b) is preferably a pipe, a hose or a specific manifold construction.

Typically the compartments are arranged in the stack such that the ion diluting compartments and the ion concentrating compartments alternate. Thus one (and only one) of compartments (a) and (b) is located between compartments (c) and (d).

The stack preferably comprises a plurality of ion diluting compartments, alternating with a plurality of ion concentrating compartments, whereby each ion diluting compartment is adjacent to an ion concentrating compartment along at least one ion diluting compartment side, and each ion concentrating compartment is adjacent to an ion diluting compartment along at least one ion concentrating compartment side.

Typically the membranes form a wall between two adjacent compartments. For example, the monovalent anion exchange membrane (mAEM) on one side of compartment (a) is also the monovalent anion exchange membrane (mAEM) on one side of compartment (d) and the monovalent cation exchange membrane (mCEM) on one side of compartment (a) is also the monovalent cation exchange membrane (mCEM) on one side of compartment (c). Also the standard cation exchange membrane on one side of compartment (b) may also be the standard cation exchange membrane on one side of compartment (d).

Thus in one embodiment:
(i) the anionic membrane wall of compartment (d) is also the anionic membrane wall of compartment (a);
(ii) the cationic membrane wall of compartment (a) is also the cationic membrane wall of compartment (c); and
(iii) the anionic membrane wall of compartment (c) is also the anionic membrane wall of compartment (b).

In another embodiment:
(i) the cationic membrane wall of compartment (a) is also the cationic membrane wall of compartment (c);
(ii) the anionic membrane wall of compartment (c) is also the anionic membrane wall of compartment (b); and
(iii) the cationic membrane wall of compartment (b) is also the cationic membrane wall of compartment (d).

In another embodiment:
(i) the anionic membrane wall of compartment (c) is also the anionic membrane wall of compartment (b);
(ii) the cationic membrane wall of compartment (b) is also the cationic membrane wall of compartment (d); and
(iii) the anionic membrane wall of compartment (d) is also the anionic membrane wall of compartment (a).

In another embodiment:
(i) the cationic membrane wall of compartment (b) is also the cationic membrane wall of compartment (d);
(ii) the anionic membrane wall of compartment (d) is also the anionic membrane wall of compartment (a); and
(iii) the cationic membrane wall of compartment (a) is also the cationic membrane wall of compartment (c).

In another embodiment:
(i) the anionic membrane wall of compartment (a) is also the anionic membrane wall of compartment (d);
(ii) the cationic membrane wall of compartment (d) is also the cationic membrane wall of compartment (b); and
(iii) the anionic membrane wall of compartment (b) is also the anionic membrane wall of compartment (c).

In another embodiment:
(i) the anionic membrane wall of compartment (c) is also the anionic membrane wall of compartment (b);
(ii) the cationic membrane wall of compartment (b) is also the cationic membrane wall of compartment (d);
(iii) the anionic membrane wall of compartment (d) is also the anionic membrane wall of compartment (a); and
(iv) the cationic membrane wall of compartment (a) is also the cationic membrane wall of compartment (c) of an adjacent stack.

In another embodiment:
(i) the anionic membrane wall of compartment (b) is also the anionic membrane wall of compartment (c);
(ii) the cationic membrane wall of compartment (c) is also the cationic membrane wall of compartment (a);
(iii) the anionic membrane wall of compartment (a) is also the anionic membrane wall of compartment (d); and
(iv) the cationic membrane wall of compartment (d) is also the cationic membrane wall of compartment (b) of an adjacent stack.

Depending on the order in which the membrane walls are placed in the stack several stack designs can be made, for example as shown in Table 1 where each of columns 1 to 8 represent the order of membrane walls and compartments in a stack, starting with the first membrane wall in row 2 of Table 1 and ending in row 10 of Table 1. In an EDM unit comprising the membrane stacks described in Table 1, the cathode compartment comprising a cathode may be located adjacent to any of the membrane walls in rows 2 and the anode compartment comprising an anode may be located adjacent to any of the membrane walls in rows 10.

TABLE 1

Membrane and Compartment Orders for the EDM stacks of the invention

|  | 1 | 2 | 3 | 4 | 5 | 6 | 7 | 8 |
|---|---|---|---|---|---|---|---|---|
| membrane | CEM | mAEM | mCEM | AEM | CEM | mAEM | mCEM | AEM |
| compartment | (d) | (a) | (c) | (b) | (b) | (d) | (a) | (c) |
| membrane | mAEM | mCEM | AEM | CEM | AEM | CEM | mAEM | mCEM |
| compartment | (a) | (c) | (b) | (d) | (c) | (b) | (d) | (a) |
| membrane | mCEM | AEM | CEM | mAEM | mCEM | AEM | CEM | mAEM |
| compartment | (c) | (b) | (d) | (a) | (a) | (c) | (b) | (d) |
| membrane | AEM | CEM | mAEM | mCEM | mAEM | mCEM | AEM | CEM |
| compartment | (b) | (d) | (a) | (c) | (d) | (a) | (c) | (b) |
| membrane | CEM | mAEM | mCEM | AEM | CEM | mAEM | mCEM | AEM |

For example the compartments are present in the stack in the order (c), (a), (d), (b) (as in column 8 of Table 1) or (d), (a), (c), (b) (as in column 1 of Table 1), the latter of which can be regarded as an example having the reverse order compared to the former. The stack may also comprise such compartments as a repeat unit, e.g. the stack optionally comprises the compartments [(c), (a), (d), (b)]$_n$ or [(d), (a), (c), (b)]$_n$ where n is greater than 1, e.g. from 1 to 1000.

Preferably the first ion concentrating compartment and the second ion concentrating compartment are not in fluid communication with each other, i.e. they are fluidly separated. This preference arises because a deposit of insoluble salts would form if the fluids from the first ion concentrating compartment and the second ion concentrating come in contact with each other.

Typically one of the ion diluting compartments (a) and (b) in each stack is in ionic communication with both of the ion concentrating compartments (c) and (d) and the other of the ion diluting compartments (a) and (b) in that stack is in ionic communication with only one of the ion concentrating compartments (c) and (d). In an ED unit comprising more than one repeat unit of the stacks of the present invention, preferably each stack is in ionic communication with the next stack. For example, one repeat unit is in ionic communication as just described and in all other repeat units one of the ion diluting compartments (a) and (b) in each repeat unit is in ionic communication with both of the ion concentrating compartments (c) and (d) of that repeat unit and the other of the ion diluting compartments (a) and (b) in that repeat unit is in ionic communication with only one of the ion concentrating compartments (c) and (d) of that repeat unit and with one of the ion concentrating compartments (c) and (d) of the next (adjacent) repeat unit.

The stack can be any shape but is preferably octagonal, rectangular or square in shape. Preferably the stack has cross-sectional dimensions when measured in the same plane as the direction of fluid flow through compartment (a) of from 40 to 250 cm×20 to 160 cm, e.g. having a length of between 40 and 250 cm and a width of between 20 and 160 cm. Examples of suitable cross-sectional dimensions include 40×80 cm, 40×100 cm, 50×50 cm, 50×100 cm, 50×160 cm, 60×120 cm, 60×160 cm, 80×160 cm, 100×100 cm and 100×200 cm.

When the stack has a rectangular cross-section then the fluid flowing through the ion diluting compartments (a) and (b) preferably runs parallel to the longest side of the rectangle and the fluid flowing through the ion concentrating compartments (c) and (d) runs parallel to the shortest side of the rectangle. This preference arises because desalination efficiency is enhanced by a longer path length for the fluid requiring desalination.

In another embodiment the height of the ion diluting compartments is lower than the height of the ion concentrating compartments. This preference arises because it can reduce the electrical resistance of the stack. Thus compartments through which fluid of low conductivity flows preferably have a low height, for example in one embodiment one or more of the ion diluting compartments comprise a spacers and/or the membranes which border with the ion diluting compartments have protrusions (which lower the effective height of the ion diluting compartment). A lower compartment height may also result in a higher pressure drop from the inlet end of the compartment to the outlet end of that compartment. In this embodiment the fluid flowing through the ion diluting compartments (a) and (b) preferably runs parallel to the shortest side wall(s) of those compartments and the fluid flowing through the ion concentrating compartments (C1) and (C2) preferably runs parallel to the longest side wall(s) of those compartments. This preference arises because the pressure in all compartments is preferably about equal to reduce the chance on internal leakages.

The stacks of the present invention may be used to prepare ED units.

According to a second aspect of the present invention there is provided an electrodialysis (ED) unit comprising a membrane stack according to the first aspect of the present invention, an anode compartment (f) comprising and anode and a cathode compartment (g) comprising a cathode, wherein the membrane stack is located between the anode compartment (f) and the cathode compartment (g).

Typically in the ED unit according to the second aspect of the present invention the compartments are present in the stack for example in the order (g), (c), (a), (d), (b), (f) or (f), (d), (a), (c), (b), (g). ED units according to the second aspect of the present invention comprising more than one stack are for example of the formula (g) [(c), (a), (d), (b)]$_n$ (f) or (f) [(d), (a), (c), (b)]$_n$ (g) wherein (g), (c), (a), (d), (b) and (f) represent the compartments (g), (c), (a), (d), (b) and (f) respectively and n is as hereinbefore defined. As described above also any of the six other compartments orders described in Table 1 may be used.

In one embodiment the outer membrane walls of the stack (being part of an electrode compartment) comprise cation exchange membranes, preferably cation exchange membranes which have a high selectivity for monovalent cations, because this is useful for preventing anions (e.g. chloride ions) and multivalent cations from entering the electrode compartments. The ED units are preferably represented by the formula (f) (c), (b), [(d), (a)]$_n$ (g) or (f) [(a), (d), (b), (c)]$_n$ (g) wherein (g), (c), (a), (d), (b), (f) and n are as hereinbefore defined.

Alternatively a robust chlorine-resistant membrane is used for the outermost membrane walls, e.g. a Nafion™ membrane. Preferably the outer membrane walls of the stack are thicker than the membranes in the other parts of the stack.

Optionally the electrode compartments serve as end plates for the ED unit. Alternatively the ED unit may be provided with end plates which are not part of the electrode compartment. Electrode compartments may also be shared between two stacks, e.g. the ED unit comprises more than two electrode compartments.

The electrode compartments optionally further comprise an electrolyte solution which is different from the fluid fed into one of the ion diluting compartments (a) and (b), or alternatively, which is identical to the fluid fed into one of the ion diluting compartments (a) and (b). Examples of electrolyte solutions that may be used in the electrode compartments include solutions comprising sodium chloride, potassium chloride, sodium sulfate, Fe(II) and Fe(III) salts (e.g. $FeCl_2$, $FeCl_3$, $FeSO_4$, $Fe_3(SO_4)_2$), and mixtures comprising two or more of the foregoing.

The electrodes preferably each independently comprise a conductive material, such as, for example, stainless steel (e.g. stainless steel mesh), graphite, titanium (e.g. a titanium mesh or plate), platinum, iridium, rhodium, niobium, zirconium, tantalum, tungsten, conductive polymers, conductive oxides, conductive polymer/carbon composites (e.g. a polyolefin/graphite composite film), or combinations comprising two or more thereof. In addition, the electrode may be uncoated or coated. Examples of coated electrodes include platinum-coated stainless steel mesh and an iridium oxide-coated titanium mesh. Non-limiting examples of conducting polymers include polyaniline, polypyrrole, polythiophene, and combinations thereof. The electrode may also comprise a mixed metal oxide, e.g. indium-doped tin oxide (ITO), antimony-doped tin oxide (ATO), and aluminium-doped zinc oxide. In one embodiment, the electrode comprises a conductive high surface layer that may be formed of any conductive materials or composites with a high surface area, e.g. active carbon, carbon nanotubes, graphite, carbon fiber, carbon cloth, carbon aerogel, metallic powders, for example nickel, metal oxides (e.g. ruthenium oxide), conductive polymers, and combinations comprising two or more of the above.

According to a third aspect of the present invention there is provided an apparatus for treating fluid comprising at least two electrodialysis (ED) units according to the second aspect of the present invention.

Preferably the at least two ED units are fluidly connected in series such that fluid entering compartment (a) or (b) of the second and any subsequent ED units is the fluid which exited compartment (b) or (a) of the preceding ED unit.

In terms of direction of flow through each ED unit, the preferences are as described above in relation to the second aspect of the present invention.

Preferably the apparatus (and each ED unit) comprise only one inlet for fluid requiring deionisation or desalination. At startup of the process two additional inlets fluidly connected to the ion concentrating compartments of the last ED unit may be used to fill up the concentrating compartments. Preferably, when the concentrating compartments are full (e.g. during steady state, continuous use of the stack or ED unit) these additional inlets are not used. However in one embodiment it is desirable to feed some feed fluid to the additional inlets e.g. in order to feed the ion concentrating compartments of the last ED unit, typically at a low flow rate. In this case the flow rates through these additional inlets are much lower than the flow rate of feed liquid through the main inlet by at least a factor 5, more preferably by at least a factor 10. For instance this low flow rate through the ion concentrating compartments may be used to make the pressure in the ion concentrating compartments about equal to the pressure in the ion diluting compartments.

Preferably the apparatus (and each ED unit) comprises only one outlet for desalinated fluid and at least two outlets for fluid whose ionic concentration has been increased.

Thus in a preferred embodiment the apparatus according to the invention comprises:
(i) at least two ED units according to the second aspect of the present invention fluidly connected in series such that fluid entering compartment (a) or (b) of the second and any subsequent ED units is the fluid which exited compartment (b) or (a) of the preceding ED unit; and/or
(ii) only one inlet for fluid requiring deionisation; and/or
(iii) one outlet for desalinated fluid and at least two outlets for fluid whose ionic concentration has been increased.

Typically the at least two ED units are connected in series such that fluid entering compartment (c) or (d) of the first and any subsequent ED units is the fluid which exited compartment (c) or (d) respectively of the next ED unit.

In one embodiment the ED units present in the apparatus are identical to each other. In one embodiment the ED units present in the apparatus are not all identical to each other, for example the stacks used in at least two of the ED units are not identical. Non-identical stacks may be prepared by using different membrane walls in each stack, e.g. membrane walls having different properties. For example, the properties of the monovalent AEM in one ED unit may be different from the properties of the monovalent AEM in another ED unit.

In a preferred embodiment the apparatus comprises at least two ED units (EDM1 and EDM2) according to the second aspect of the present invention configured such that the membrane walls on each side of compartment(s) (a) and/or (b) of the first of the ED units have different properties compared to the membrane walls on each side of compartment(s) (a) and/or (b) of a subsequent ED unit, e.g. the electrical resistance of the membrane walls on each side of compartment(s) (a) and/or (b) of a (for example of each) unit is lower than the electrical resistance of the membrane walls on each side of compartment(s) (a) and/or (b) in a (for example the) next ED unit. For example, the membrane walls on each side of compartment(s) (a) and/or (b) of EDM1 have a lower electrical resistance than the membrane walls on each side of compartment(s) (a) and/or (b) of EDM2 and so forth. The different properties typically do not refer to monovalent selectivity, but to properties such as electrical resistance and water permeability. In all ED units the membrane walls on each side of compartment (a) are mAEM and mCEM. The above statement on membrane properties does not include the two outermost membranes of the ED unit facing the electrode compartments, when present. The two outermost membranes may be identical in all ED units.

The height of the ion diluting compartments and the ion concentrating compartments (i.e. the smallest of the three dimensions length, width and height) is preferably between 50 and 1000 μm, more preferably between 70 and 600 μm, e.g. 100, 200, 250, 300, 400 or 500 μm. Thus the membrane walls on each side of each compartment are preferably between 50 and 1000 μm, more preferably between 70 and 600 μm, e.g. 100, 200, 250, 300, 400 or 500 μm apart. The ion diluting compartments and the ion concentrating compartments may have the same height or a different height. The compartment height may be the same in all stacks or the height of compartments in one stack may be different from the compartment height in another compartment within that same stack, different from the compartment height in another stack or different from the compartment height in another ED unit. Also the apparatus may comprise ED units which have stacks comprising compartments all having the same height, or stacks comprising compartments which have different heights from one stack to the next. For example the height of the ion diluting compartments in a stack may be less than the height of the ion concentrating compartments of that stack. By using different heights for the ion concentrating and ion diluting compartments and adjusting the flow rate through the compartments one may reduce the pressure differences between adjacent ion concentrating and ion diluting compartments.

According to a fourth aspect of the present invention there is provided a process for desalinating a feed fluid comprising passing that feed fluid through an ED unit according to the second aspect of the present invention or an apparatus according to the third aspect of the present invention as a voltage is applied across the anode and cathode of the or each ED unit.

Typically the feed fluid comprises monovalent anions and cations and higher-valent anions and cations (higher-valent ions are ions having a valency of at least 2). The process typically separates the feed fluid into a stream depleted in said anions and cations and into at least two concentrate streams at least one of which is enriched in said higher-valent anions and at least another of which is enriched in said higher-valent cations.

In the process of the present invention the feed fluid requiring desalination may pass through each EDM unit twice, e.g. first through compartment (a) and then through compartment (b) or first through compartment (b) and then through compartment (a). Preferably the feed fluid requiring desalination passes first through compartment (a) and then through compartment (b).

In the first ion diluting compartment (a) mainly monovalent ions are removed from the feed fluid due to the presence of the mAEM and mCEM. The removed ions pass into the ion concentrating compartments (c) and (d). In the second ion diluting compartment (b) both monovalent and higher-valent ions are removed from the feed fluid because the membrane walls on each side in the second ion diluting compartment are less selective towards monovalent ions than the mCEM and mAEM used in the first ion diluting compartment. Also these removed ions pass into the ion concentrating compartments (c) and (d).

It should be noted that "first" and "second" may be interchanged, i.e. the feed fluid may pass through compartments (a) and (b) in either order.

The present invention has several advantages over the currently available EDM systems. Not only is no additional sodium chloride supply required, also less energy is required and the desalination of the feed fluid is more efficient because the feed fluid passes through the stack twice. As a consequence fewer stacks are needed to achieve the desired level of desalination making the system commercially advantageous for both CAPEX and OPEX reasons. When the feed fluid contains fewer equivalents of monovalent ions than equivalents of multivalent ions preferably additional monovalent ions are added to the feed fluid.

In one embodiment the apparatus comprises two ED units fluidly connected in series. The feed fluid enters the first ED unit (EDM1), passes through both ion diluting compartments (a) and (b) of EDM1 and then enters the second ED unit (EDM2) where it passes through both ion diluting compartments (a) and (b) of EDM2. Optionally the feed fluid is recirculated through EDM1 twice or more times; however in a preferred process the feed fluid passes through compartments (a) and (b) of EDM1 only once. One may also recirculate the fluid exiting (a) and (b) of EDM1 through EDM2 several times; however in a preferred process the fluid exiting (a) or (b) of EDM1 passes through compartments (a) and (b) of EDM2 only once. The fluid exiting EDM1 compartment (a) and (b) has a lower ion content than the feed fluid entering compartment (a) or (b) of EDM1. Similarly the fluid exiting EDM2 compartment (a) or (b) has a lower ion content than the feed fluid entering compartment (a) or (b) of EDM2.

The preference described above is also true for apparatus comprising more than two ED units fluidly connected in series. Thus preferably the feed fluid passes through compartments (a) and (b) of each ED unit only once. The two (or more) ED units connected in series may be in the same housing or each in a separate housing.

Preferably the ED units are configured such that the flow direction between ED units of fluid through the ion diluting compartments is countercurrent to the direction of flow through the ion concentrating compartments.

For example, the apparatus according to the third aspect of the present invention is configured such that feed fluid which has flowed through the ion diluting compartment (a) and (b) of a first ED unit according to the second aspect of the present invention (EDM1) subsequently flows through the ion diluting compartments (b) or (a) of the next ED unit according to the second aspect of the present invention (EDM2) and fluid which has flowed through the ion concentrating compartments (c) and (d) of the next ED unit (EDM2) subsequently flows through the ion concentrating compartments (c) and (d) respectively of the previous ED unit (EDM1). The fluid exiting the ion concentrating compartments (c) and (d) of the first ED unit (EDM1) form two concentrate product streams. These concentrate product streams from the first ED unit (EDM1) may be stored temporarily in stock tanks until further treatment is undertaken such as evaporation and/or crystallization.

Typically one of the fluids leaving compartments (c) and (d) has an elevated concentration of higher-valent anions compared to the fluid entering that compartment and the other has an elevated concentration of higher-valent cations compared to the fluid entering that other compartment. Typically both fluids have an elevated concentration of monovalent anions and cations.

Optionally the process comprises the step of transferring the fluids exiting compartments (c) and (d) to separate circulation tanks and optionally recirculating such fluids through compartment (c) or (d) respectively of the same ED unit, e.g. until the fluid has a desired ionic concentration.

The fluids flowing through the ion concentrating compartments (c) and (d) are typically circulated via circulation tanks. As the fluids flow through ion concentrating compartments (c) and (d) ions and some water pass from the compartments (a) and (b), through the membrane walls of those compartments and into the stream of fluid passing through the concentrating compartments (c) and (d). In this way, the feed fluid requiring desalination is depleted in ions (and loses water) and the fluid passing through the concentrating compartments (c) and (d) is enriched in ions (and gains water). Thus the apparatus preferably further comprises at least two concentrate circulation tanks per ED unit, each in fluid communication with one of the ion concentrating compartments (c) and (d).

The fluid exiting concentrating compartments (c) and (d) of the second and any subsequent ED units according to the second aspect of the present invention (e.g. EDM2, EDM3 etc.) may be fed into respective circulation tanks, for example using a feed and bleed mechanism. Then the fluid in the respective circulation tanks may be circulated through the respective ion concentrating compartments (c) and (d) of the same ED unit and bled into the respective ion concentrating compartments (c) and (d) of the preceding ED unit (e.g. concentrate from EDM2, compartment (c) may be fed into compartment (c) of EDM1 via a respective circulation tank and concentrate from EDM2, compartment (d) may be fed into compartment (d) of EDM1 via a respective circulation tank, and so forth). Thus preferably fluids passing through the ion concentrating compartments (c) and (d) are circulated through the respective ion concentrating compartments (c) and (d) of the same ED unit and are then fed into the respective ion concentrating compartments (c) and (d) of the preceding ED unit.

The voltage which is applied across the anode and cathode of the or each ED unit in the process of the present invention causes ions and water to be transported from the ion diluting compartments to the ion concentrating compartments.

In a preferred process according to the fourth aspect of the present invention, when the process has reached steady state the process is performed such that (and the apparatus is configured such that) fluid fed through ion concentrating compartments (c) and (d) of the second and any subsequent ED units is the fluid exiting the same compartment of the same ED unit. For example, the fluid exiting ion concentrating compartment (c) of EDM2 is fed back to the inlet of the ion concentrating compartment (c) of EDM2, preferably via a (small) circulation tank. If desired a low flow of feed fluid may be provided to the ion concentrating compartments or to the corresponding circulation tanks of the last ED unit but preferably—if possible—this is not done when the process has achieved steady state because it is not necessary.

Typically the fluid exiting compartment (d) has a high content of higher-valent anions and a low content of higher-valent cations while the fluid exiting compartment (c) has a high content of higher-valent cations and a low content of higher-valent anions. In this way, scaling can be reduced or completely avoided because the counter ions which could otherwise form water-insoluble or low solubility salts are kept separate.

Thus preferably the process is performed such that fluid which has passed through compartment (c) of any of the ED units is not mixed with fluid which has passed through compartment (d) of any of the ED units. Thus the concentrate obtained from the (c) compartments is kept separate from the concentrate obtained from the (d) compartments.

However, in one embodiment, the process further comprises the additional step of mixing fluid which has passed through compartment (c) of any of the ED units with fluid which has passed through compartment (d) of any of the ED units, e.g. in a crystallizer. This further step is preferably performed external to the ED units. Such a precipitate of salts may have commercial value in its own right, but the mixing should be done external to the ED unit because if the mixing occurs within the ED unit the precipitate could foul the membrane walls and hinder the flow of fluid through the ED unit.

In a preferred embodiment the process is a continuous process. After charging the apparatus and a steady state has been achieved, there is no need to perform the process on a batch basis. Fluid exiting compartment (a) or (b) (whichever is later) of each ED unit may be fed into the compartment (a) or (b) of the subsequent ED unit. When the process is first started and before steady state has been achieved all ion concentrating compartments (c) and (d) (and concentrate circulation tanks when present) are gradually filled-up (or their content is replaced by feed fluid).

Optionally each ED unit comprises a diluate circulation tank which is fluidly coupled to ion diluting compartment (a) and/or (b). The diluate circulation tank may be used at startup until the steady state is reached or it may be used continuously to increase the desalination efficiency of the apparatus (by requiring a lower number of stacks).

When the apparatus comprises three ED units the fluid exiting compartments (c) and (d) of the second and third ED unit are preferably fed into compartments (c) and (d) respectively of the preceding ED unit (relative to the order in which fluid requiring desalination passes through the ED units). For example, the fluid streams exiting compartments (c) and (d) of the second ED unit are fed respectively into the compartments (c) and (d) of the first ED unit and the fluid streams exiting compartments (c) and (d) of the third ED unit are fed respectively into the compartments (c) and (d) of the second ED unit and so forth.

Thus the difference in ion concentration between the ion diluting compartments and the ion concentrating compartments in the third ED unit (when present) is reduced compared to cocurrent operation. Furthermore, when the concentrate from each ED unit is recirculated to the same ED unit (and to the preceding one via a bleed mechanism) a low circulation volume can be used whereby a great efficiency is achieved, particularly when the recirculated concentrate flows between ED units in a direction counter to the direction of flow through compartment (a) and/or (b). A high yield of desalinated water of more than 70% can be achieved compared to a yield of at most 50% for a conventional desalination system such as reversed osmosis.

The apparatus of the present invention optionally comprises more than three ED units depending on the desired extent of desalination. When the feed fluid as it enters the first ED unit has a very high ion content the apparatus preferably comprises three or more than three ED units fluidly connected in series to keep the desalination rate per EDM unit within desired limits. The desalination extent and the rate of desalination may be controlled as desired to provide water having the desired ionic concentration. The apparatus may contain any number of ED units of the present invention, but preferably comprises 2 to 8 of such ED units, especially 2, 3 or 4 of such ED units in series.

As described above the height of the ion diluting compartments and the ion concentrating compartments in each stack is preferably between 50 and 1000 µm and may be different for each stack and for each ED unit. For example, in the apparatus of the present invention the height of the compartments in the first ED unit (EDM1) may be greater than in the subsequent ED unit(s) (EDM2, EDM3 etc.). In the second and any subsequent ED units, when present, the height of the ion diluting compartments (a) and (b) is preferably less than the height of the ion diluting compartments (a) and (b) in the first ED unit because the fluid passing through the later units has a lower ionic concentration and therefore higher electrical resistivity. By reducing the height of ion diluting compartments (a) and (b) in the second and any subsequent ED units compared to the height of the ion diluting compartments (a) and (b) in the first ED unit one may reduce the energy consumption of the ED unit, although a lower height does also increase the energy required to pump liquids through the compartments and therefore a height is desired which achieves lowest overall energy consumption. Preferably the height of the ion diluting compartments (a) and (b) is selected based on the composition of the feed fluid and the number of ED units in the apparatus.

In each ED unit the ratio of the flowrate of fluid through compartment (a) and/or (b) relative to average flow rate of fluid through both of compartments (c) and (d) of that unit is preferably between 10:1 and 1:10, more preferably between 3:1 and 1:3, especially about 1:1, i.e. the flow rates through all compartments of a given ED unit is preferably about the same, especially when the height of the compartments (a), (b), (c) and (d) of that unit is about the same. About equal flow rates through compartments (a), (b), (c) and (d) is preferred to keep the pressure difference between the ion diluting compartments and the ion concentrating compartments low and thereby reduces the chance of fluid leakage. When the heights of the compartments (a) and (b) are less than the height of the ion concentrating compartments (c) and (d) preferably the flow rate through the compartments (a) and (b) is lower than the flow rate through the concentrating compartments (c) and (d).

The feed fluid requiring desalination entering the first ED unit of the apparatus preferably comprises water and monovalent and higher-valent ions. Preferably the feed fluid comprises more molar equivalents of monovalent ions than of higher-valent ions. Preferably the ratio of molar equivalents of monovalent ions and molar equivalents of higher-valent ions is higher than 1.1, more preferably higher than 1.5. This preference arises from the need to have sufficient monovalent counter ions to balance the charge of the higher-valent ions.

During the process of the present invention the electrical resistance across the ED unit changes over time. Therefore a preferred embodiment comprises varying the voltage applied across the anode and cathode of the or each ED unit as the electrical resistance of that ED unit changes (e.g. while keeping the current constant) or varying the current applied across the anode and cathode of the or each ED unit as the electrical resistance of that ED unit changes (e.g. while keeping the voltage constant). The voltage applied across the anode and cathode of each ED unit during the process of the present invention may be the same or they may be different. For instance the voltage applied across the anode and cathode of the first ED unit (EDM1) may be a constant voltage whereas the current is variable and the voltage applied across the anode and cathode of the second and any subsequent ED units (e.g. EDM2, EDM3 etc.) may be variable whereas the current is constant in order to minimise the cost of desalination. The voltage applied across the electrodes of the first and each subsequent ED unit of the apparatus is preferably below the limiting current density (LCD).

Fast desalination is preferred because in a fast desalination process the osmotic water transport is reduced and thus the efficiency of the process is enhanced: a higher yield of desalinated water and more concentrated product streams. However the higher efficiency is achieved at the cost of a higher energy usage. Depending on the application optimal settings can be chosen.

Optionally the apparatus comprises two or more parallel sets of the at least two electrodialysis (ED) units connected in series. In this way the capacity of the apparatus is at least doubled. The total number of ED units in an apparatus may be large, e.g. more than 100 or even more than 1000, when a high capacity is desired. Optionally such an apparatus comprises shared concentrate and diluate circulation tanks to reduce costs, provided that the stream of concentrate exiting each compartment (c) does not mix with the concentrate exiting any compartment (d).

According to a fifth aspect the present invention provides an apparatus comprising at least four electrodialysis (ED) units, each ED unit comprising an anode compartment (f), a cathode compartment (g) and a membrane stack; wherein each membrane stack comprises:
(a) a first ion diluting compartment;
(b) a second ion diluting compartment;
(c) a first ion concentrating compartment;
(d) a second ion concentrating compartment; and
(e) a membrane wall between each compartment and on the outside of the first and last compartment of the stack; wherein:
(i) the membrane stack in each ED unit is located between the anode compartment (f) and the cathode compartment (g) of that ED unit;
(ii) each membrane wall comprises a cation exchange membrane or an anion exchange membrane and the order of cation and anion exchange membranes alternates from each wall to the next in each stack;
(iii) in each stack, the membrane walls on each side of compartment (a) both have a higher monovalent ion selectivity than the corresponding membrane walls on each side of compartment (b); and
(iv) each ED unit further comprises a means for communicating fluid between compartment(s) (a) of that ED unit and compartment(s) (b) of a subsequent or preceding ED unit and between compartment(s) (b) of that ED unit and compartment(s) (a) of a subsequent or preceding ED unit.

The preferences for the various components and features of the fifth aspect of the present invention are as described in relation to other aspects of the present invention except that the means for communicating fluid between compartments (a) and (b) are connected to compartments (b) and (a) of adjacent ED units (as opposed to compartments (b) and (a) of the same ED unit).

The monovalent ion selectivity of the membranes may be determined as follows:
Monovalent Ion Selectivity of the Cation Exchange Membranes The monovalent ion selectivity of the cation exchange membranes was determined as follows. A test feed fluid described below was passed through a conventional ED Unit (ED Test Unit 1) comprising ten cell pairs, each pair comprising the cation exchange membrane under test and an anion exchange membrane (Selemion ASV from Asahi Glass Corp.). The cation exchange membrane under test had an effective membrane area of 0.0037 $m^2$, membrane size of 8.9×4.1 cm. Furthermore, there was a spacer between each membrane and the next (a 480 µm woven spacer from Deukum GmbH).

As test feed fluid there was used a composition comprising water and the following components:
Test Feed Fluid:

| Ion | Concentration (mg/l) |
|---|---|
| $Na^+$ | 26321 |
| $Mg^{2+}$ | 412 |
| $Ca^{2+}$ | 1372 |
| $Cl^-$ | 40718 |
| $SO_4^{2-}$ | 4500 |
| $HCO_3^-$ | 274 |

As electrolyte for the anode and cathode compartments of ED Test Unit 1 there was used sodium sulfate solution (0.5M).

The ED Test Unit 1 was then run as follows:

| | | |
|---|---|---|
| Concentrate compartment: | volume | 0.25 l |
| | Flow rate | 4.8 l/h |
| Diluate compartment: | volume | 3.5 l |
| | Flow rate | 4.8 l/h |
| Electrolyte: | Composition | 0.5M $Na_2SO_4$ |
| | Volume | 1.5 l |
| | Flow rate | 100 l/h |
| Current density | 350 A/$m^2$ | |
| Current | 1.28 A | |

After recirculating the Test feed fluid through ED Test unit 1 for 200 minutes, the concentrations of $Na^+$ and $Ca^{2+}$ were measured by inductively coupled plasma optical emission spectrometry (ICP-OES). The monovalent ion selectivity of the cation exchange membrane was then calculated using Formula (1) as described above.
Monovalent Ion Selectivity of the Anion Exchange Membranes The monovalent ion selectivity of the anion exchange membranes was determined by passing the test feed fluid described above through a conventional ED Unit (ED Test Unit 1) as described above in relation to measurement of the monovalent ion selectivity of the cation exchange membranes. However in this case ED Test Unit 1 comprised ten cell pairs, each pair comprising the anion exchange membrane under test and a cation exchange membrane (Selemion CSO from Asahi Glass Corp.). The anion exchange membrane under test had an effective membrane area of 0.0037 m², membrane size of 8.9×4.1 cm. Furthermore, there was a spacer between each membrane and the next (a 480 μm woven spacer from Deukum GmbH).

After recirculating the above-described Test feed fluid through ED Test unit 1 for 200 minutes, the concentrations of Cl⁻ and $SO_4^{2-}$ were measured by ion chromatography. The monovalent ion selectivity of the anion exchange membrane was then calculated using Formula (1) as described above.

The invention will now be illustrated by the following non-limiting Examples in which the following abbreviations are used:

| | |
|---|---|
| mAEM | means an ACS anion exchange membrane obtained from Astom Corp., Japan having an ER of 3.8 ohm · cm² and having a monovalent selectivity (i.e. a high selectivity for monovalent anions compared to higher-valent anions). |
| mCEM | means a CIMS cation exchange membrane obtained from Astom Corp., Japan having an ER of 1.8 ohm · cm² and having a monovalent selectivity (i.e. a high selectivity for monovalent cations compared to higher-valent cations). |
| AEM | means an AMX 'standard' anion exchange membrane obtained from Astom Corp., Japan having an ER of 2.4 ohm · cm² and having a low selectivity for monovalent anions compared to higher-valent anions. |
| CEM | means a CMX 'standard' cation exchange membrane obtained from Astom Corp., Japan having an ER of 3.0 ohm · cm² and having a low selectivity for monovalent cations compared to higher-valent cations. |

The selectivity of the membranes was determined using the method described above.

| Membrane | Monovalent Ion selectivity |
|---|---|
| mAEM | 5.10 |
| AEM | 3.04 |
| mCEM | 3.70 |
| CEM | 0.89 |

As can be calculated from the table above mAEM is 1.7 times more monovalent selective than the 'standard' anion exchange membrane AEM and mCEM is 4.2 times more monovalent selective than the 'standard' cation exchange membrane CEM.

EXAMPLE 1

A membrane stack MS1 was built comprising 81 membranes. The order of the membranes in the stack was [CEM—AEM—mCEM—mAEM—]$_n$CEM wherein n is 20. The membranes mCEM and mAEM are on each side of compartment (a) and the membranes CEM and AEM within the square brackets are on each side of compartment (b). Therefore the stack comprised a repeat unit of compartments [(b), (c), (a), (d)]$_n$.

The stack comprised the membranes in the order indicated above, a spacer (480 μm thick woven spacer from Deukum GmbH) between each membrane and the next, one inlet for feed liquid, two inlets for concentrates, one outlet for desalinated liquid and two outlets for concentrates and pipes fluidly connecting each compartment (a) with compartment (b). Furthermore, the stack was constructed such that fluid passing through compartment (a) flows in the opposite direction to the fluid passing through compartment (b) and in crossflow direction to fluid passing through compartments (c) and (d). The membranes all had an effective area of 10 cm×10 cm.

Preparation of an ED Unit Suitable for Use in EDM

An ED Unit was prepared from stack MS1 by placing the stack between a cathode and an anode and fastening the membranes, cathode and anode together using end-plates and bolts.

The stack further comprised a pipe to ensure that fluid requiring desalination would flow through both ion diluting compartments such that the fluid passed through compartment (a) first and then through compartment (b).

The EDM unit comprised compartments in the order [(b), (c), (a), (d)]$_n$. Therefore the stack comprised a repeat unit of compartments (g)[(b), (c), (a), (d)]$_n$(f) wherein n is 20.

Preparation of an Apparatus and Use of the Process

An apparatus may be prepared in accordance with FIG. 4 using the three ED units prepared above.

For the purpose of testing the process of the present invention, the apparatus illustrated in FIG. 4 was simulated by performing three separate desalinations using the ED unit prepared above three times. The ED unit is referred to as EDM1 in the first desalination step, EDM2 in the second desalination step and EDM3 in the third desalination step. For clarity reasons in the results given below the amounts were normalized. The aim of the third desalination step (using EDM3) was to produce potable water having a conductivity of about 0.5 mS/cm.

The process conditions were as shown in Table 2 below:

TABLE 2

| | ED Unit | | |
|---|---|---|---|
| Setting | EDM1 | EDM2 | EDM3 |
| Flow rate of feed fluid requiring desalination passing through compartments (a) and (b) (L/h) | 50 | 50 | 50 |
| Flow rate of concentrate passing through compartments (c) and (d) (L/h) | 50 | 50 | 50 |
| Flow rate electrolyte passing through compartments (f) and (g) | 100 | 100 | 100 |
| Electrolyte concentration in water (M Na₂SO₄) | 0.5 | 0.5 | 0.5 |
| Electrolyte conductivity (mS/cm) | 67 | 67 | 67 |
| Fixed voltage applied across the anode and cathode (V) | 20 | 20 | 30 |
| Temperature of all fluids (° C.) | 19-22 | 19-22 | 19-22 |
| Recirculation time through ED Unit (min) | 954 | 511 | 575 |

The temperature of the fluids gradually increased during the process from about 19° C. to about 22° C.

The feed fluid requiring desalination, entering the first ED unit (EDM1), was designed to simulate sea water and had the composition shown in Table 3 below:

TABLE 3

| Feed fluid requiring desalination | | |
|---|---|---|
| Ingredient | Composition | unit |
| NaCl | 3184.000 | g |
| CaCl₂•2H₂O | 183.358 | g |
| Na₂SO4 | 473.107 | g |
| KCl | 87.706 | g |
| MgCl₂•6H₂O | 1475.383 | g |
| water | 94.596 | kg |
| Total | 100.000 | kg |
| density | 1.03037 | g/cm³ |
| conductivity (at 23° C.): | 65.5 | mS/cm |
| TDS | 45.75 | g/kg |

The first and second desalination steps used the concentrates exiting the next ED unit (countercurrent to the fluid requiring desalination). Therefore in the simulation the third desalination step was performed first. To be able to perform the third desalination step first it was necessary to determine the composition of the fluid requiring desalination that was to be used as feed fluid for the ion diluting compartments of EDM3 and also the composition of the fluid requiring desalination that was to be used as the feed fluid for the ion diluting compartments of EDM2. Thus first and separately, the desalination performance in EDM1 and EDM2 was determined. In EDM1 the conductivity of the feed fluid requiring desalination was found to be reduced from 65.5 to 28.3 mS/cm. In EDM2 the conductivity in the fluid requiring desalination was decreased from 28.3 to 8.56 mS/cm. The compositions of the desalinated fluid exiting EDM1 and EDM2 are shown in Table 4 below. These compositions were then used in the second part of this Example as the fluid requiring desalination to be passed through the ion diluting compartments of EDM2 and EDM3 respectively to simulate a continuous process according to the present invention in which the order of desalination is EDM1>EDM2>EDM3.

TABLE 4

Composition of desalinated fluid exiting EDM1 and EDM2

| Ingredient | Composition exiting EDM1 | Composition exiting EDM2 | unit |
|---|---|---|---|
| NaCl | 1079.308 | 218.005 | g |
| $CaCl_2 \cdot 2H_2O$ | 70.760 | 11.038 | g |
| $Na_2SO4$ | 318.742 | 162.928 | g |
| KCl | 32.928 | 8.641 | g |
| $MgCl_2 \cdot 6H_2O$ | 746.773 | 227.477 | g |
| water | 97.751 | 99.372 | kg |
| Total | 100.000 | 100.000 | kg |
| density | 1.01242 | 1.00344 | $g/cm^3$ |
| conductivity (at 23° C.) | 28.3 | 8.56 | mS/cm |
| TDS | 18.34 | 5.04 | g/kg |

In the simulation, the first step of the process was to perform the third desalination step through EDM3. A composition identical to that which would have exited EDM2 (as shown in the third column of Table 4) was used as the fluid requiring desalination and was passed through compartments (a) and (b) of EDM3 and the feed fluid requiring desalination (as shown in Table 3) was passed through compartments (c) and (d) of EDM3. The fluids were recirculated through their respective compartments of EDM3 until the conductivity of the fluid in the ion diluting compartments (a) and (b) had reached the target of 0.5 mS/cm.

The fluids exiting compartments (c) and (d) of EDM3 were fed into the ion concentrating compartments (c) and (d) of EDM2 respectively and the desalinated fluid exiting the EDM1 (as shown in the second column of Table 4) was passed through the ion diluting compartments (a) and (b) of EDM2. The fluids were recirculated through their respective compartments of EDM2 for 511 minutes until the conductivity of the fluid in the ion diluting compartments of EDM2 reached a value of 8.3 mS/cm which was close to the composition of the fluid requiring desalination used as the feed for the ion diluting compartments (a) and (b) of EDM3 above.

The fluids exiting compartments (c) and (d) of EDM2 were fed into the ion concentrating compartments (c) and (d) of EDM1 respectively and feed fluid (as shown in Table 3) was passed through the ion diluting compartments (a) and (b) of EDM1. The fluids were recirculated through their respective compartments of EDM1 for 954 minutes until the conductivity of the fluid in the ion diluting compartments of EDM1 reached a value of 28.3 mS/cm.

The properties of the fluid requiring desalination entering each ED unit and the properties of the desalinated fluid and concentrate fluids exiting each ED unit are described in Table 5. The ion composition of the feed fluid, the desalinated fluid as exited from EDM3 and the two concentrate fluids as exited from EDM1 are listed in Table 6.

The final overall yield of desalinated water having a low conductivity that makes it suitable as potable water is more than 72% relative to the amount of feed fluid. This is very high compared to other desalination techniques.

TABLE 5

Results of The Three Desalination Experiments through EDM1, EDM2 and EDM3 Described Above
(i.e. Simulation of a Continuous Process of the Present Invention

| | ED Unit | | | |
|---|---|---|---|---|
| | EDM1 | EDM2 | EDM3 | units |
| Weight of fluid requiring desalination on entering the ED unit | 78.49 | 65.12 | 60.00 | kg |
| Weight of fluid requiring desalination exiting the EDM unit | 65.12 | 60.00 | 57.00 | kg |
| Concentrate (d) weight on entering the ED unit | 6.02 | 3.51 | 2.02 | kg |
| Concentrate (d) weight when exiting the ED unit | 12.52 | 6.02 | 3.51 | kg |
| Concentrate (c) weight on entering the ED unit | 6.15 | 3.53 | 2.02 | kg |
| Concentrate (c) weight when exiting the ED unit | 13.07 | 6.15 | 3.53 | kg |
| Conductivity of fluid requiring desalination on entering the ED unit | 65.5 | 28.3 | 8.56 | mS/cm |
| Conductivity of desalinated fluid when exiting the ED unit | 28.3 | 8.3 | 0.49 | mS/cm |
| Concentrate 1 conductivity on entering the ED unit | 140.4 | 96.7 | 65.5 | mS/cm |
| Concentrate 1 conductivity when exiting the ED unit | 171.6 | 140.4 | 96.7 | mS/cm |
| Concentrate 2 conductivity on entering the ED unit | 127 | 79.8 | 65.5 | mS/cm |
| Concentrate 2 conductivity when exiting the ED unit | 164.4 | 127 | 79.8 | mS/cm |
| Recirculation time through the ED unit | 954 | 511 | 575 | minutes |
| Used power | 0.816 | 0.337 | 0.164 | kWh |
| Diluate yield | 83.0 | 92.1 | 95.0 | % |

Overall diluate yield was 72.6%. Yield means the volume ratio of desalinated fluid exiting EDM3 compared to the volume of feed fluid requiring desalination which entered EDM1.

TABLE 6

Analysis of Fluids

| Concentration (mg/l) | $SO_4^{2-}$ | $Cl^-$ | $Ca^{2+}$ | $K^+$ | $Mg^{2+}$ | $Na^+$ | Total (mg/l) |
|---|---|---|---|---|---|---|---|
| Feed fluid requiring desalination entering EDM1 | 3005 | 27471 | 489 | 436 | 1652 | 12643 | 45696 |
| Desalinated fluid exiting EDM3 | 29 | 178 | 1 | 8 | 8 | 111 | 335 |
| Concentrate fluid exiting EDM1, compartment (d) | 885 | 106185 | 3822 | 2051 | 10553 | 45885 | 169382 |
| Concentrate fluid exiting EDM1, compartment (c) | 8617 | 96154 | 359 | 2359 | 488 | 52097 | 160074 |

The sulfate and chloride contents described in Table 6 above were measured by ion chromatography (IC) and the content of other ions were measured by inductively coupled plasma optical emission spectrometry (ICP-OES).

EXAMPLE 2

A similar simulation experiment was performed but with the flows between ED units in cocurrent direction. For the three steps the same feed fluid requiring desalination and the same settings were used as in Example 1. Thus feed fluid requiring desalination was used as input for the ion diluting compartment (a) and for the concentrating compartments (c) and (d) of EDM1. Also the fluid exiting compartment (a) of EDM1 was fed into compartment (b) of EDM1. Fluid streams were recirculated through compartments (a) and (b) of EDM1 until the conductivity of the fluid requiring desalination was reduced to 27.1 mS/cm and simultaneously fluid streams exiting compartments (c) and (d) were recirculated back through compartments (c) and (d) of EDM1 respectively. The three fluid streams exiting compartments (b), (c) and (d) of EDM1 were fed into compartments (a), (c) and (d) of EDM2 respectively for the second step. In the second step, fluid requiring desalination was recirculated through the ion diluting compartments (a) and (b) of EDM2 until the fluid had a conductivity of 8.6 mS/cm and simultaneously fluid streams exiting compartments (c) and (d) were recirculated back through compartments (c) and (d) of EDM2 respectively. In the third step, the fluid requiring desalination exiting compartment (b) of EDM2 was recirculated through compartments (a) and (b) of EDM3 until the target conductivity of 0.5 mS/cm was obtained. The two streams recirculating through compartment (c) and (d) of EDM3 respectively were the resultant concentrate product streams.

The overall yield was 65.3%. The ion content of the concentrate fluids exiting EDM3 was lower than of the concentrate fluids exiting EDM1 in Example 1.

The power consumption was slightly higher than in Example 1. Even so, the yield was good compared to other desalination techniques. The properties of the fluids in each step are given in Table 7.

TABLE 7

| | EDM 1 | EDM2 | EDM3 | units |
|---|---|---|---|---|
| Weight of fluid requiring desalination on entering the ED unit | 78.49 | 67.78 | 59.86 | kg |
| Weight of fluid requiring desalination exiting the EDM unit | 67.78 | 59.86 | 51.73 | kg |
| Weight of concentrate (d) on entering the ED unit | 5.91 | 10.86 | 13.80 | kg |
| Weight of concentrate (d) when exiting the ED unit | 10.86 | 13.80 | 17.26 | kg |
| Weight of concentrate (c) on entering the ED unit | 5.91 | 11.41 | 15.7 | kg |
| Weight of concentrate (c) when exiting the ED unit | 11.41 | 15.7 | 20.14 | kg |
| Conductivity of fluid requiring desalination on entering the ED unit | 65.5 | 27.1 | 8.6 | kg |
| Conductivity of desalinated fluid when exiting the ED unit | 27.1 | 8.6 | 0.5 | mS/cm |
| Conductivity of concentrate (d) on entering the ED unit | 65.5 | 150 | 153 | mS/cm |
| Conductivity of concentrate (d) when exiting the ED unit | 150 | 153 | 144 | mS/cm |
| Conductivity of concentrate (c) on entering the ED unit | 65.5 | 153 | 147.2 | mS/cm |
| Conductivity of concentrate (c) when exiting the ED unit | 153 | 147.2 | 125 | mS/cm |
| Recirculation time through the ED unit | 886 | 705 | 800 | Min's |
| Used power | 0.756 | 0.394 | 0.397 | kWh |
| Yield of desalinated fluid | 86.3 | 88.3 | 85.7 | % |

The invention claimed is:

1. An electrodialysis (ED) unit comprising a membrane stack comprising the following components:
    a first ion diluting compartment (a);
    a second ion diluting compartment (b);
    a first ion concentrating compartment (c);
    a second ion concentrating compartment (d); and
    a membrane wall between each pair of adjacent compartments and membrane walls on the outside of the first and last compartment of the stack;
   wherein:
   (i) each membrane wall comprises a cation exchange membrane or an anion exchange membrane and the order of the cation and anion exchange membranes alternates from each wall to the next;
   (ii) the membrane walls on each side of the first ion diluting compartment (a) both have a higher monovalent ion selectivity than the corresponding membrane walls on each side of the second ion diluting compartment (b);
   (iii) means for communicating fluid between compartments (a) and (b) comprising a direct connection between compartments (a) and (b) such that it provides a pathway for a fluid stream to flow from compartment (a) to compartment (b); and
   (iv) the compartments are in the order (d) (a) (c) (b), (a) (c) (b) (d), (c) (b) (d) (a), (b) (d) (a) (c), (b) (c) (a) (d), (c) (a) (d) (b), (a) (d) (b) (c) or (d) (b) (c) (a).

2. The ED unit according to claim 1 wherein the membrane walls on each side of compartment (a) both have a monovalent ion selectivity of at least 1.5 times the monovalent ion selectivity of the membrane walls on each side of compartment (b).

3. The ED unit according to claim 1 wherein the compartments are arranged in the stack such that the ion diluting compartments and the ion concentrating compartments alternate.

4. The ED unit according to claim 1 wherein:
(i) the anionic membrane wall of compartment (d) is also the anionic membrane wall of compartment (a);
(ii) the cationic membrane wall of compartment (a) is also the cationic membrane wall of compartment (c); and
(iii) the anionic membrane wall of compartment (c) is also the anionic membrane wall of compartment (b).

5. The ED unit according to claim 1 wherein:
(i) the anionic membrane wall of compartment (a) is also the anionic membrane wall of compartment (d);
(ii) the cationic membrane wall of compartment (d) is also the cationic membrane wall of compartment (b); and
(iii) the anionic membrane wall of compartment (b) is also the anionic membrane wall of compartment (c).

6. The ED unit according to claim 1 wherein:
(i) the anionic membrane wall of compartment (c) is also the anionic membrane wall of compartment (b);
(ii) the cationic membrane wall of compartment (b) is also the cationic membrane wall of compartment (d);
(iii) the anionic membrane wall of compartment (d) is also the anionic membrane wall of compartment (a); and
(iv) the cationic membrane wall of compartment (a) is also the cationic membrane wall of compartment (c) of an adjacent stack of the ED unit.

7. The ED unit according to claim 1 wherein:
(i) the anionic membrane wall of compartment (b) is also the anionic membrane wall of compartment (c);
(ii) the cationic membrane wall of compartment (c) is also the cationic membrane wall of compartment (a);
(iii) the anionic membrane wall of compartment (a) is also the anionic membrane wall of compartment (d); and
(iv) the cationic membrane wall of compartment (d) is also the cationic membrane wall of compartment (b) of an adjacent stack of the ED unit.

8. The ED unit according to claim 1 wherein compartments (c) and (d) are not in fluid communication with each other.

9. The ED unit according to claim 1 further comprising, an anode compartment (f) comprising an anode and a cathode compartment (g) comprising a cathode, wherein the membrane stack is located between the anode compartment (f) and the cathode compartment (g).

10. The ED unit according to claim 1 configured such that the direction of fluid flow through at least one compartment is not the same as the direction of fluid flow through the next compartment(s).

11. The ED unit according to claim 1 configured such that the direction of fluid flow through two of compartments (a) to (d) is not the same as the direction of fluid flow through the other two of compartments (a) to (d).

12. The ED unit according to claim 1 configured such that fluids flowing through the ion concentrating compartment(s) flow at an angle of 0 to 180 degrees relative to the direction of fluid flowing through the second ion diluting compartment (b).

13. The ED unit according to claim 1 configured such that fluids flowing through the ion concentrating compartment(s) flow in an opposite direction to fluid flowing through the second ion diluting compartment (b).

14. The ED unit according to claim 1 wherein when the direction of fluid flow through at least one compartment is not the same as the direction of fluid flow through an adjacent compartment, the relative directions of flow are at an angle of 90°, 135° or 180°.

15. The ED unit according to claim 1 further comprising a pipe, a hose or a manifold wherein compartment (a) is in fluid communication with compartment (b) via the pipe, the hose or the manifold.

16. The ED unit according to claim 1 further comprising a spacer or gasket wherein the membrane walls on each side of a compartment are secured to the spacer or gasket by clamping or by welding, curing or an adhesive.

* * * * *